(12) United States Patent
Omura et al.

(10) Patent No.: US 11,815,723 B2
(45) Date of Patent: Nov. 14, 2023

(54) OPTICAL CONNECTION STRUCTURE, OPTICAL CONNECTOR, AND OPTICAL CONNECTING METHOD

(71) Applicants: SUMITOMO ELECTRIC INDUSTRIES, LTD., Osaka (JP); SUMITOMO ELECTRIC OPTIFRONTIER CO., LTD., Yokohama (JP); JAPAN COMMUNICATION ACCESSORIES MANUFACTURING CO., LTD., Komaki (JP); SUMITOMO ELECTRIC LIGHTWAVE CORP., Raleigh, NC (US)

(72) Inventors: Masaki Omura, Osaka (JP); Motoyoshi Kimura, Komaki (JP); Takayuki Yokochi, Osaka (JP); Shunichi Watanabe, Osaka (JP); Junji Fukui, Yokohama (JP); Yasuyuki Maekawa, Yokohama (JP); Takayuki Shimazu, Osaka (JP); Takashi Kondo, Raleigh, NC (US); Kenichiro Otsuka, Osaka (JP)

(73) Assignees: SUMITOMO ELECTRIC INDUSTRIES, LTD., Osaka (JP); SUMITOMO ELECTRIC OPTIFRONTIER CO., LTD., Yokohama (JP); JAPAN COMMUNICATION ACCESSORIES MANUFACTURING CO., LTD., Komaki (JP); SUMITOMO ELECTRIC LIGHTWAVE CORP., Raleigh, NC (US)

( * ) Notice: Subject to any disclaimer, the term of this patent is extended or adjusted under 35 U.S.C. 154(b) by 38 days.

(21) Appl. No.: 17/511,086

(22) Filed: Oct. 26, 2021

(65) Prior Publication Data
US 2023/0125413 A1   Apr. 27, 2023

(51) Int. Cl.
G02B 6/38 (2006.01)

(52) U.S. Cl.
CPC ........ *G02B 6/3885* (2013.01); *G02B 6/3847* (2013.01); *G02B 6/3882* (2013.01)

(58) Field of Classification Search
CPC ... G02B 6/3885; G02B 6/3847; G02B 6/3882
(Continued)

(56) References Cited

U.S. PATENT DOCUMENTS 8,920,042 B2    12/2014   Aoki et al.
9,759,869 B2    9/2017    Verheyden et al.
(Continued)

FOREIGN PATENT DOCUMENTS

JP    2009-056715 A    3/2009
JP    2012-027394 A    2/2012

*Primary Examiner* — Jerry M Blevins
(74) *Attorney, Agent, or Firm* — Oliff PLC

(57) ABSTRACT

An optical connection structure including first optical fibers, second optical fibers, a first optical connector, and a second optical connector is disclosed. The first optical connector is configured such that each of first distal end portions of the first optical fibers protrudes from a first front end surface to the outside when the first optical connector and the second optical connector are connected to each other. Each of the first distal end portions is inserted into a corresponding second fiber hole of the second optical connector. The second optical connector is configured such that each of second distal end portions of the second optical fibers is moved rearward inside second fiber holes due to each of the first distal end portions respectively inserted into the second fiber holes. The first optical fibers and the second optical fibers are optically coupled to each other inside the second fiber holes.

15 Claims, 30 Drawing Sheets

(58) Field of Classification Search
USPC .......................................................... 385/59
See application file for complete search history.

(56) References Cited

U.S. PATENT DOCUMENTS

| | | | |
|---|---|---|---|
| 9,829,643 | B2 | 11/2017 | Kadar-Kallen et al. |
| 11,048,051 | B2 | 6/2021 | Verheyden et al. |
| 2017/0293092 | A1* | 10/2017 | Sano .................... G02B 6/3676 |
| 2020/0341209 | A1 | 10/2020 | Higley |
| 2020/0355874 | A1 | 11/2020 | Trauschein et al. |
| 2021/0018699 | A1 | 1/2021 | Wong et al. |

* cited by examiner

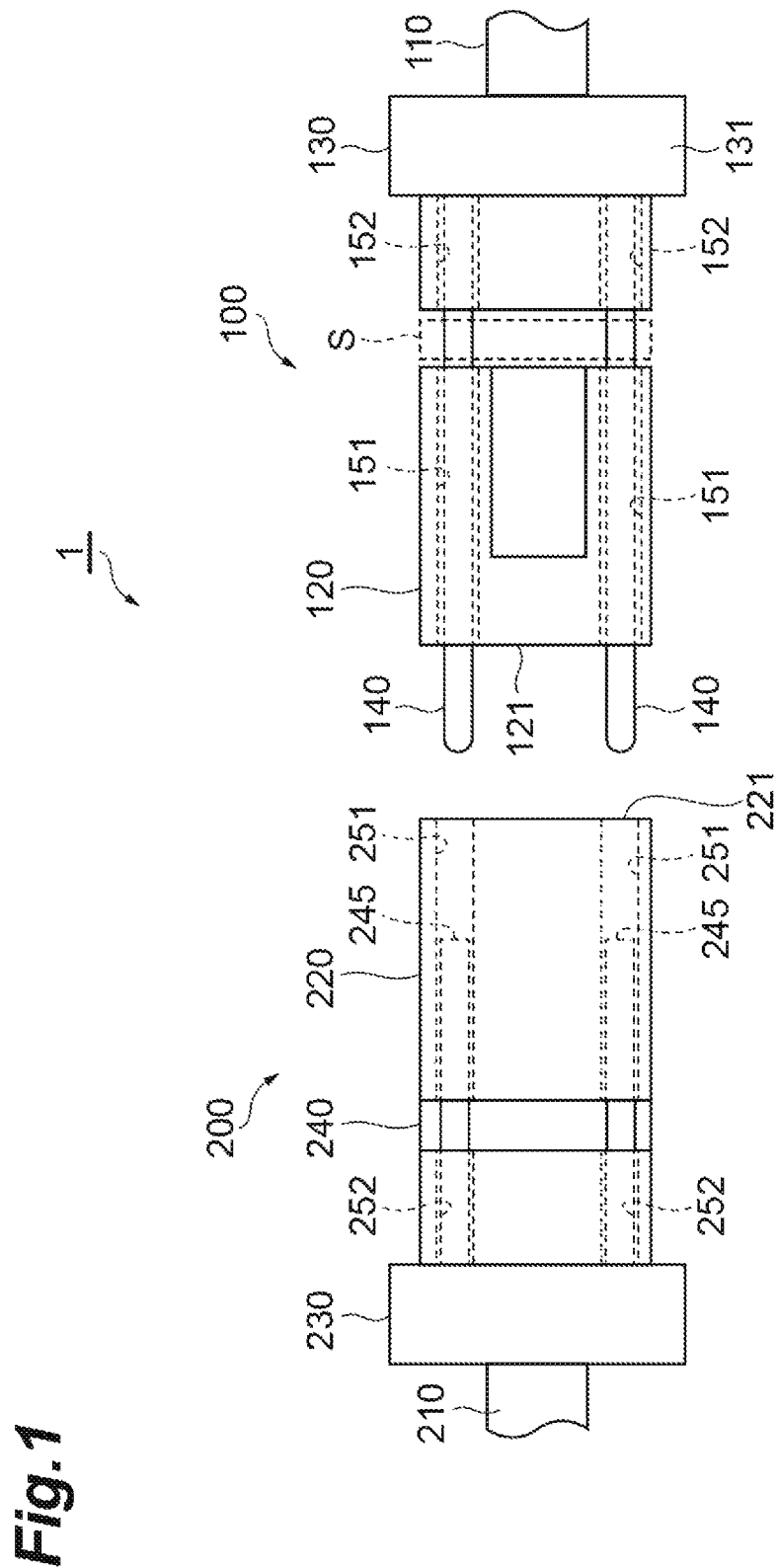

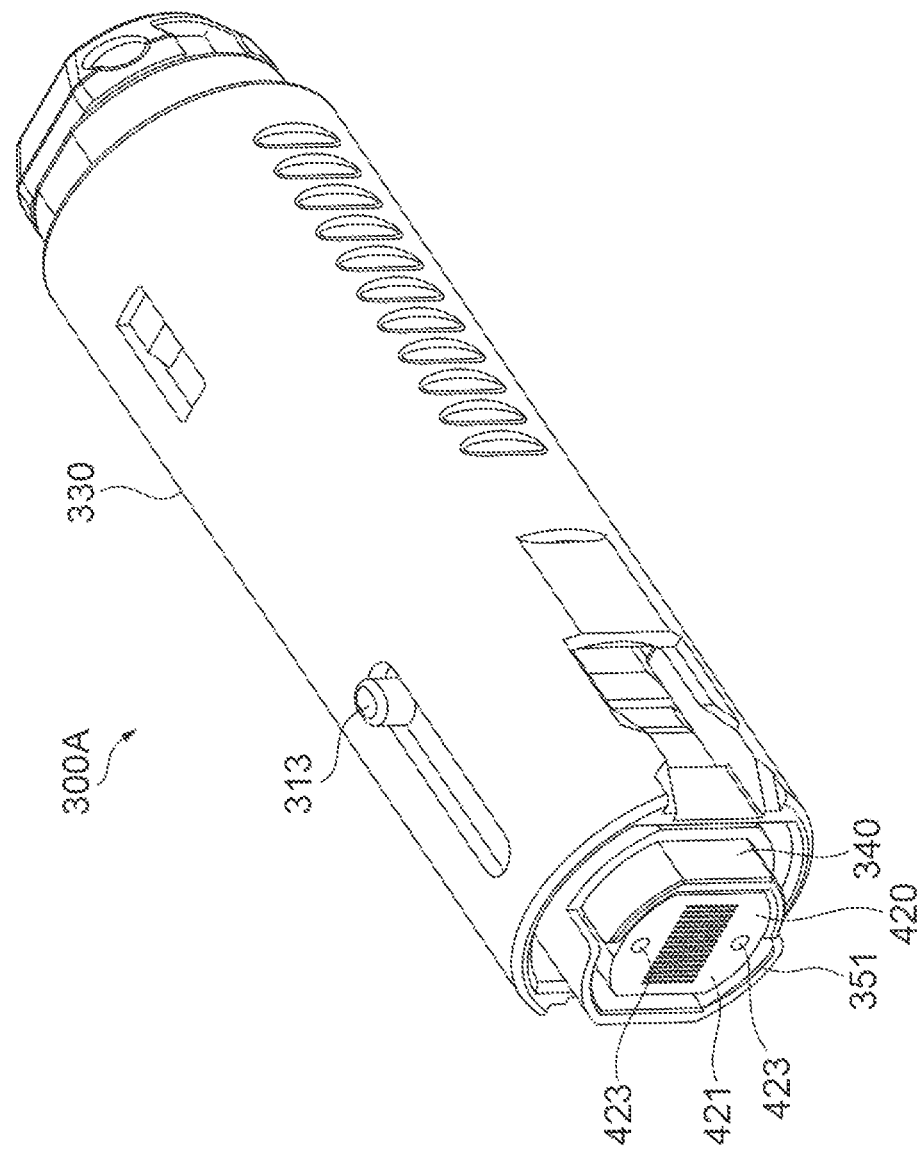

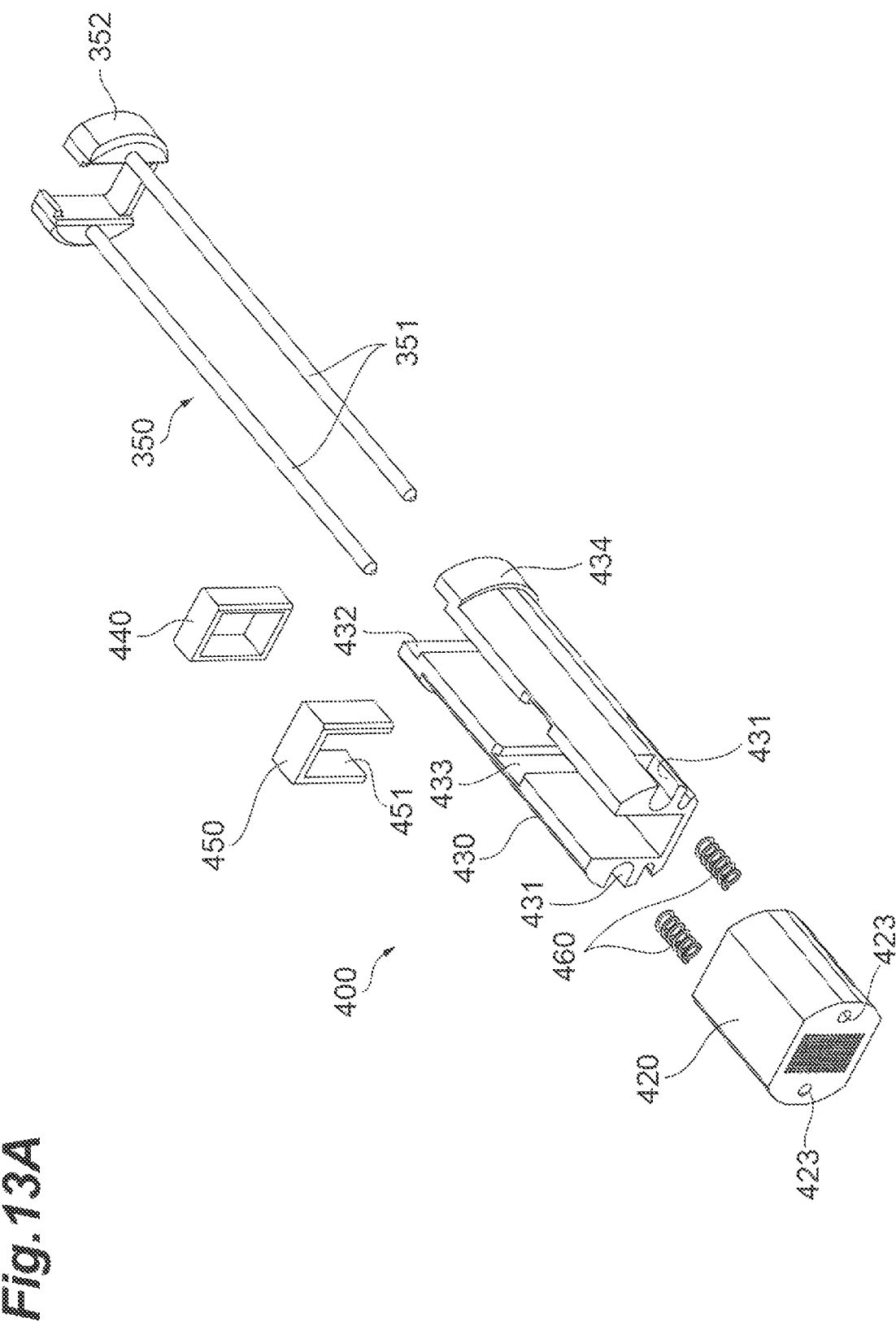

OPTICAL CONNECTION STRUCTURE, OPTICAL CONNECTOR, AND OPTICAL CONNECTING METHOD

TECHNICAL FIELD

The present disclosure relates to an optical connection structure, an optical connector, and an optical connecting method.

BACKGROUND

JP2012-027394A discloses a constitution in which a plurality of first optical fibers and a plurality of second optical fibers are connected to each other via an adapter provided with a plurality of connection holes.

SUMMARY

The present disclosure provides an optical connection structure. This optical connection structure includes a plurality of first optical fibers, a plurality of second optical fibers, a first optical connector, and a second optical connector. Each of the plurality of first optical fibers extends in a longitudinal direction. Each of the plurality of second optical fibers extends in the longitudinal direction. The first optical connector includes a first front end surface and a plurality of first fiber holes opening on the first front end surface, and holds the plurality of first optical fibers. The second optical connector includes a second front end surface and a plurality of second fiber holes opening on the second front end surface, and holds the plurality of second optical fibers. The first optical connector is configured such that each of first distal end portions of the plurality of first optical fibers respectively accommodated in the plurality of first fiber holes protrudes from the first front end surface outside of the plurality of first fiber holes when the first optical connector and the second optical connector are connected to each other. Each of the first distal end portions protruding from the first front end surface is inserted into a corresponding second fiber hole of the plurality of second fiber holes of the second optical connector. The second optical connector is configured such that each of second distal end portions of the plurality of second optical fibers is moved rearward inside the plurality of second fiber holes due to each of the first distal end portions respectively inserted into the plurality of second fiber holes when the first optical connector and the second optical connector are connected to each other. In this optical connection structure, the plurality of first optical fibers and the plurality of second optical fibers are optically coupled to each other inside the plurality of second fiber holes when the first optical connector and the second optical connector are connected to each other.

The present disclosure discloses a first optical connector. The first optical connector includes a plurality of first optical fibers, a first front ferrule, and a first rear ferrule. Each of the plurality of first optical fibers extends in a longitudinal direction. The first front ferrule includes a first front end surface and a plurality of first fiber holes opening on the first front end surface. The first rear ferrule holds the plurality of first optical fibers. The first front ferrule is able to relatively move in the longitudinal direction with respect to the first rear ferrule. The first optical connector is configured such that each of first distal end portions of the plurality of first optical fibers protrudes from the first front end surface outside of the plurality of first fiber holes when the first optical connector is connected to a second optical connector.

The present disclosure discloses a second optical connector. The second optical connector includes a plurality of second optical fibers, a second front ferrule, and a second rear ferrule. Each of the plurality of second optical fibers extends in a longitudinal direction. The second front ferrule includes a second front end surface and a plurality of second fiber holes opening on the second front end surface. The second rear ferrule holds the plurality of second optical fibers. The second front ferrule is fixed to the second rear ferrule. The second optical connector is configured such that each of second distal end portions of the plurality of second optical fibers is moved rearward inside the plurality of second fiber holes from the second front end surface when the second optical connector is connected to a first optical connector.

The present disclosure provides an optical connecting method. This optical connecting method is a method for connecting the foregoing first optical connector to the foregoing second optical connector, and optically coupling the plurality of first optical fibers to the plurality of second optical fibers.

BRIEF DESCRIPTION OF THE DRAWINGS

FIG. 1 is a view illustrating an example of an optical connection structure according to an embodiment of the present disclosure.

FIG. 10B is a perspective view illustrating a state in which a shutter is open in the second optical connector illustrated in FIG. 6

FIG. 13A is an exploded perspective view of the core part illustrated in FIGS. 11A and 12A.

DETAILED DESCRIPTION

Figure 2A:
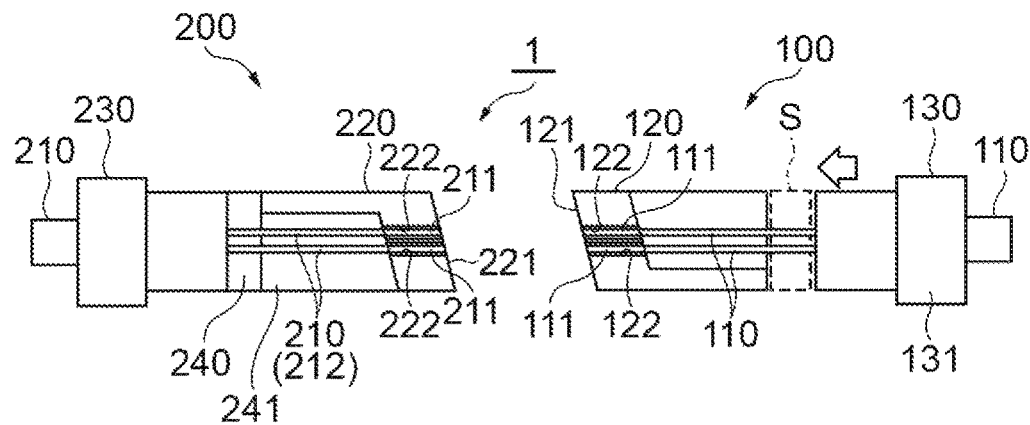
FIGS. 2A, 2B, and 2C are explanatory views of a method for connecting a first optical connector to a second optical connector in the optical connection structure illustrated in FIG. 1.

Problem to be Solved by Present Disclosure

In the optical connection structure described in JP2012-027394A, a plurality of first optical fibers and a plurality of second optical fibers are respectively optically coupled to each other via an adapter having a plurality of connection holes. However, in this optical connection structure, there is a possibility that a foreign substance (dust or the like) may enter the connection holes in a stage before optical coupling. If a foreign substance temporarily enters the connection holes, it is difficult to remove the foreign substance from the fine connection holes. Thus, this optical connection structure may deteriorate coupling efficiency of optical coupling.

Hence, it is desirable to provide a connection structure which can improve efficiency of optical coupling using a simple means.

Effects of Present Disclosure

According to the present disclosure, efficiency of optical coupling can be improved using a simple means.

Description of Embodiment of Present Disclosure

First, embodiments of the present disclosure will be enumerated and described. An optical connection structure according to an embodiment of the present disclosure includes a plurality of first optical fibers, a plurality of second optical fibers, a first optical connector, and a second optical connector. Each of the plurality of first optical fibers extends in a longitudinal direction. Each of the plurality of second optical fibers extends in the longitudinal direction. The first optical connector includes a first front end surface and a plurality of first fiber holes opening on the first front end surface, and holds the plurality of first optical fibers. The second optical connector includes a second front end surface and a plurality of second fiber holes opening on the second front end surface, and holds the plurality of second optical fibers. The first optical connector is configured such that each of first distal end portions of the plurality of first optical fibers respectively accommodated in the plurality of first fiber holes protrudes from the first front end surface outside of the plurality of first fiber holes when the first optical connector and the second optical connector are connected to each other. Each of the first distal end portions protruding from the first front end surface is inserted into a corresponding second fiber hole of the plurality of second fiber holes of the second optical connector. The second optical connector is configured such that each of second distal end portions of the plurality of second optical fibers is moved rearward inside the plurality of second fiber holes due to each of the first distal end portions respectively inserted into the plurality of second fiber holes when the first optical connector and the second optical connector are connected to each other. In this optical connection structure, the plurality of first optical fibers and the plurality of second optical fibers are optically coupled to each other inside the plurality of second fiber holes when the first optical connector and the second optical connector are connected to each other. In this optical connection structure, the first optical connector is configured such that each of the first distal end portions of the plurality of first optical fibers respectively accommodated in the plurality of first fiber holes protrudes from the first front end surface to the outside when the first optical connector and the second optical connector are connected to each other, and each of these protruding first distal end portions is inserted into a corresponding second fiber hole of the plurality of second fiber holes of the second optical connector. The second optical connector is configured such that each of the second distal end portions of the plurality of second optical fibers is moved rearward inside the plurality of second fiber holes due to each of the first distal end portions respectively inserted into the plurality of second fiber holes. That is, in this optical connection structure, the first optical fibers and the second optical fibers are optically coupled to each other in the respective plurality of second fiber holes in which the optical fibers are accommodated before connection. For this reason, despite a simple means, a foreign substance is unlikely to enter the fiber holes in which optical coupling is performed, and thus efficiency of optical coupling can be easily improved. In addition, since the plurality of first optical fibers and the plurality of second optical fibers are connected to each other inside the plurality of second fiber holes, axial misalignment is unlikely to occur, and thus efficiency of optical coupling can be enhanced. Moreover, since the plurality of first optical fibers and the plurality of second optical fibers are connected to each other inside the plurality of second fiber holes, the second fiber holes can be utilized for positioning the first optical fibers and the second optical fibers. Accordingly, a loss in optical coupling can be reduced mainly by controlling hole diameters of the second fiber holes.

As one embodiment, the first optical connector may include a first front ferrule including the first front end surface and the plurality of first fiber holes, and a first rear ferrule holding the plurality of first optical fibers. The first front ferrule may be able to relatively move in the longitudinal direction with respect to the first rear ferrule. According to this embodiment, in the first optical connector, a simple constitution in which each of the first distal end portions of the plurality of first optical fibers protrudes from the first front end surface can be provided. In addition, due to the constitution in which the first front ferrule moves with respect to the first rear ferrule holding the plurality of first optical fibers, variation of amounts of the first distal end portions of the first optical fibers protruding from the first front end surface is reduced, and thus stable optical coupling can be performed.

As one embodiment, the first front ferrule may include a pair of guide holes provided in the longitudinal direction. The first front ferrule may be able to relatively move in the longitudinal direction with respect to the first rear ferrule along a pair of guide pins fixed to the first rear ferrule. According to this embodiment, movement of the first front ferrule with respect to the first rear ferrule is performed along the pair of guide pins so that an operation of causing each of the first distal end portions of the first optical fibers to protrude from the first front end surface can be stably performed.

As one embodiment, the second optical connector may include a pair of guide holes provided in the longitudinal direction. The pair of guide pins inserted into the pair of guide holes of the first front ferrule and protruding from the first front end surface may be respectively inserted into the pair of guide holes of the second optical connector when the first optical connector and the second optical connector are connected to each other. According to this embodiment, positioning of the first optical connector and the second optical connector can be more reliably performed.

As one embodiment, the first optical connector may further include a restriction member restricting bending of a part of the plurality of optical fibers leading to the respective first distal end portions when each of the first distal end portions of the plurality of first optical fibers protrudes from the first front end surface to the outside. According to this embodiment, in the first optical connector, each of the first distal end portions of the plurality of first optical fibers can more reliably protrude from the first front end surface. In addition, since bending of the first optical fibers is restricted, variation of the protruding amounts is reduced, and thus stable optical coupling can be performed.

As one embodiment, an amount of each of the first distal end portions of the plurality of first optical fibers caused to protrude from the first end surface by the first optical connector when the first optical connector and the second optical connector are connected to each other may be equal to or less than 2 mm. According to this embodiment, each of the first distal end portions of the plurality of first optical fibers protruding from the first optical connector can be more reliably inserted into the plurality of second fiber holes of the second optical connector. Accordingly, efficiency of optical coupling between the first optical fibers and the second optical fibers can be further enhanced.

As one embodiment, the second optical connector may include a second front ferrule including the second front end surface and the plurality of second fiber holes, and a second rear ferrule holding the plurality of second optical fibers. The second front ferrule may be fixed to the second rear ferrule. According to this embodiment, in the second optical connector, a simple constitution in which each of the second distal end portions of the plurality of second optical fibers is moved rearward inside the second fibers can be provided.

As one embodiment, shapes of the first front ferrule and the second front ferrule may be the same as each other. Shapes of the first rear ferrule and the second rear ferrule may be the same as each other. According to this embodiment, costs can be reduced by standardizing members constituting the optical connection structure.

As one embodiment, the second optical connector may further include a bending portion for bending a part of the plurality of second optical fibers leading to the respective second distal end portions when each of the second distal end portions of the plurality of second optical fibers is moved rearward. According to this embodiment, at places (second fiber holes) where the first optical fibers and the second optical fibers are connected to each other, the end surfaces of both fibers can abut each other and optical coupling can be performed without fixing both the fibers. For this reason, a small pressurizing force is required for a connection point between individual fibers (low pressurization). In addition, each of the fibers is independent, and bending (repulsive force) caused by the bending portion can be utilized as a pressurizing force therefor. Thus, even when a number of optical fibers are connected to each other, variation of a length (protrusion) of each of the fibers can be absorbed by the bending portion. Therefore, no extra pressurizing force is required. Particularly, when each of the first optical connector and the second optical connector holds numerous optical fibers and the number thereof exceeds 100, a force to an extent of 80 N (approximately 8 kg) is required for one connector in simple calculation in ordinary MPO connectors. When fibers having end surfaces with a suitable curvature are connected to each other, although the force itself for PC-connection between single-mode fibers is not so large, an extra pressurizing force except fiber connection is required in order to absorb angular misalignment of MT ferrules, a protruding difference between fibers, and the like. In the case of the optical connection structure according to the present embodiment, as described above, a pressurizing force can be reduced, and a repulsive force caused by bending of each of the fibers can be utilized. Therefore, numerous fibers can be coupled to each other with high efficiency.

In the foregoing embodiment, a length of the bending portion in the longitudinal direction may be equal to or greater than 10 mm and equal to or less than 20 mm. In this case, a pressurizing force required for PC-connection between the optical fibers can be more reliably ensured, and occurrence of a bending loss of the optical fibers can be prevented. Moreover, reliability of mechanical strength of the optical fibers can be ensured.

In the foregoing embodiment, the bending portion may include a bending control mechanism configured to control a bending direction of the plurality of second optical fibers.

In this case, even when a number of optical fibers are bent, congestion of bending of the optical fibers can be prevented.

As one embodiment, each of the first distal end portions and each of the second distal end portions may be constituted of glass fibers in which a coating resin is removed, and a length of each of the glass fibers in the longitudinal direction may be equal to or greater than 2 mm and equal to or less than 5 mm. According to this embodiment, the optical connection structure, the first optical connector, and the second optical connector can be miniaturized, while reliability of optical coupling between the first optical fibers and the second optical fibers in the optical connection structure is ensured.

As one embodiment, a length of a hole part of the plurality of second fiber holes holding a part having each of the first distal end portions and each of the second distal end portions constituted of the glass fibers abutting each other may be equal to or greater than 1 mm and equal to or less than 3 mm in the longitudinal direction. According to this embodiment, optical coupling between the first optical fibers and the second optical fibers inside the second fiber holes can be more reliably performed.

As one embodiment, the plurality of first fiber holes may include forty or more fiber holes, and the plurality of first optical fibers may include forty or more optical fibers. The plurality of second fiber holes may include forty or more fiber holes, and the plurality of second optical fibers may include forty or more optical fibers. A corresponding optical fiber of the plurality of first optical fibers may be disposed in each of the plurality of first fiber holes. A corresponding optical fiber of the plurality of second optical fibers may be disposed in each of the plurality of second fiber holes. Each of the first optical connector and the second optical connector may include 40 or more optical fibers as described above. For example, it may include 48 optical fibers, may include 96 optical fibers, may include 144 optical fibers, or may include 192 optical fibers.

As one embodiment, the first front end surface may be inclined with respect to a surface orthogonal to axes of the plurality of first fiber holes. The second front end surface may be inclined with respect to a surface orthogonal to axes of the plurality of second fiber holes. According to this embodiment, even when axial misalignment is likely to occur between the connected optical fibers, axial misalignment can be reduced, and a connection loss in optical coupling can be reduced.

A first optical connector according to another embodiment of the present disclosure includes a plurality of first optical fibers, a first front ferrule, and a first rear ferrule. Each of the plurality of first optical fibers extends in a longitudinal direction. The first front ferrule includes a first front end surface and a plurality of first fiber holes opening on the first front end surface. The first rear ferrule holds the plurality of first optical fibers. The first front ferrule is able to relatively move in the longitudinal direction with respect to the first rear ferrule. The first optical connector is configured such that each of first distal end portions of the plurality of first optical fibers protrudes from the first front end surface outside of the plurality of first fiber holes when the first optical connector is connected to a second optical connector.

As one embodiment of the first optical connector, the first optical connector may further include a restriction member configured to restrict bending of a part of the plurality of optical fibers leading to the respective first distal end portions when each of the first distal end portions of the plurality of first optical fibers protrudes from the first front end surface to the outside. The first rear ferrule may have a tubular shape extending in the longitudinal direction and including at least one opening. This restriction member may be installed by being inserted from the opening part of the first rear ferrule. According to this embodiment, the plurality of first optical fibers can be held in the first optical connector by a simple constitution, and action thereof can be restricted (can be prevented from being bent).

As one embodiment of the first optical connector, the first optical connector may further include a frame-shaped first fixing member to fix the plurality of first optical fibers in the first rear ferrule. The first fixing member may be installed behind the restriction member in the first rear ferrule. According to this embodiment, in the first optical connector, when an operation of causing the plurality of first optical fibers to protrude from the first front end surface to the outside is performed, a part of the first optical fibers accommodated inside the first optical connector can be more reliably held without having it bent.

As one embodiment of the first optical connector, the first optical connector may further include a shutter member to cover the first front end surface of the first front ferrule. The shutter member may have a shutter main body accommodating the first front ferrule on an inward side, and a pair of shutter plates turnably attached to the shutter main body centering on an axis extending in a direction intersecting the longitudinal direction and covering the first front end surface. The shutter main body may be able to relatively move rearward in the longitudinal direction with respect to the first front ferrule. The pair of shutter plates may be configured to move rotationally to be open when the first front ferrule moves forward in the longitudinal direction with respect to the shutter main body. According to this embodiment, a foreign substance (dust or the like) can be more reliably prevented from adhering to the first front end surface of the first optical connector and each of the distal ends of the plurality of first optical fibers exposed on the first front end surface. Accordingly, when the first optical fibers are coupled to the second optical fibers, deterioration of efficiency of optical coupling due to a foreign substance can be prevented, and thus efficiency of optical coupling can be enhanced. In addition, due to the constitution in which a foreign substance is unlikely to adhere to the first front end surface and each of the distal ends of the first optical fibers, cleaning or the like of the end surface when the first optical fibers are connected to the second optical fibers can be omitted or simplified, and thus connection work becomes easy. In addition, the pair of shutter plates and the shutter main body may be constituted using elastically deformable materials. In this case, an operation of opening and closing the pair of shutter plates can be smoothly performed. The second optical connector may be provided with a member having a constitution similar to the shutter member described above. Also in this case, efficiency of optical coupling can be further enhanced.

A second optical connector according to another embodiment of the present disclosure includes a plurality of second optical fibers, a second front ferrule, and a second rear ferrule. Each of the plurality of second optical fibers extends in a longitudinal direction. The second front ferrule includes a second front end surface and a plurality of second fiber holes opening on the second front end surface. The second rear ferrule holds the plurality of second optical fibers. The second front ferrule is fixed to the second rear ferrule. The second optical connector is configured such that each of second distal end portions of the plurality of second optical fibers is moved rearward inside the plurality of second fiber holes from the second front end surface when the second optical connector is connected to a first optical connector.

As one embodiment of the second optical connector, the second optical connector may further include a bending portion to bend a part of the plurality of second optical fibers leading to the respective second distal end portions when each of the second distal end portions of the plurality of second optical fibers is moved rearward. The bending portion may include a bending control mechanism to control a bending direction of the plurality of second optical fibers. The second rear ferrule may have a tubular shape extending in the longitudinal direction and including at least one opening. The bending control mechanism may be installed in the second rear ferrule by being inserted from the opening part of the second rear ferrule. According to this embodiment, the plurality of second optical fibers can be held by a simple constitution in the second optical connector, and action of bending can be controlled.

As one embodiment of the second optical connector, the second optical connector may further include a frame-shaped second fixing member to fix the plurality of second optical fibers in the second rear ferrule. The second fixing member may be installed behind the bending control mechanism in the second rear ferrule. According to this embodiment, in the second optical connector, a part of the second optical fibers accommodated inside the second optical connector can be more stably bent and can be more reliably held when the plurality of second optical fibers are moved rearward.

As one embodiment of the second optical connector, a space for bending the part of the plurality of optical fibers may be provided in the bending portion, and the space may be filled with a gelatinous substance. According to this embodiment, an operation of aligning fibers when the second optical fibers are bent is more easily controlled. In addition, a repulsive force when the second optical fibers are bent can be increased, and thus efficiency of optical coupling can be enhanced by enhancing a pressurizing force when the first optical fibers and the second optical fibers abut each other.

As one embodiment of the second optical connector, each of the plurality of second fiber holes may include a first inner diameter part having a first inner diameter and a second inner diameter part having a second inner diameter larger than the first inner diameter. The first inner diameter may be equal to or less than 130 μm, and the second inner diameter may be equal to or less than 260 μm. According to this embodiment, since the inner diameters of the second fiber holes are sufficiently small at parts where the first optical fibers and the second optical fibers abut each other (for example, glass fiber parts), optical coupling can be enhanced by more reliably performing abutting between the fibers. Meanwhile, since the inner diameters of the second fiber holes are slightly larger at parts where the second optical fibers operate (for example, fibers including coated parts), rearward movement of the second optical fibers can be smoothly performed, and insertion of the first optical fibers into the second fiber holes can be more reliably performed.

As one embodiment of the second optical connector, a length of the first inner diameter part in the longitudinal direction may be equal to or greater than 1 mm and equal to or less than 3 mm. According to this embodiment, optical coupling between the first optical fibers and the second optical fibers inside the second fiber holes can be more reliably performed.

As one embodiment of the second optical connector, in the plurality of second fiber holes, a tapered part may be formed close to at least one of the second front end surface and a surface opposite to the second front end surface in the longitudinal direction. When the tapered part is formed close to the second front end surface of the second fiber holes, the first optical fibers can be smoothly inserted into the second fiber holes, and damage to the end surfaces of the first optical fibers at the time of insertion is curbed. Thus, the first optical fibers and the second optical fibers can be more reliably optically coupled to each other. In addition, when the tapered part is formed close to the surface opposite to the second front end surface of the second fiber holes, the second optical fibers is more reliably bent when the second optical fibers are moved rearward from the second fiber holes. Further, when the second optical fibers are returned to original positions after being moved rearward from the second fiber holes, damage to the second optical fibers in opening regions of the second fiber holes can be prevented, and an operation of bending the second optical fibers in the second optical connector can be continued.

An optical connecting method according to another embodiment of the present disclosure is a method for connecting the first optical connector according to any of the embodiments described above to the second optical connector according to any of the embodiments described above, and optically coupling the plurality of first optical fibers to the plurality of second optical fibers. According to this connecting method, efficiency of optical coupling between the plurality of first optical fibers and the plurality of second optical fibers can be easily improved.

As one embodiment of the optical connecting method, the optical connecting method may include causing the first front end surface of the first optical connector and the second front end surface of the second optical connector to face each other and performing positioning of the plurality of first optical fibers and the plurality of second optical fibers, moving a first rear ferrule toward the second optical connector in the longitudinal direction with respect to a first front ferrule in the first optical connector and causing each of the first distal end portions of the plurality of first optical fibers to protrude from the first front end surface to the outside, and inserting each of the first distal end portions protruding from the first front end surface into a corresponding second fiber hole of the plurality of second fiber holes of the second optical connector and moving each of the second distal end portions of the plurality of second optical fibers rearward from the second front end surface using each of the first distal end portions inserted into the plurality of second fiber holes. In this optical connecting method, in the inserting, the plurality of first optical fibers and the plurality of second optical fibers may be optically coupled to each other inside the plurality of second fiber holes.

As one embodiment of the optical connecting method, the optical connecting method may further include cleaning at least one of each of the first distal end portions of the plurality of first optical fibers exposed on the first front end surface and each of the second distal end portions of the plurality of second optical fibers exposed on the second front end surface. The cleaning may be performed before the inserting. Accordingly, a foreign substance (dust or the like) adhered to the end surfaces of the optical fibers can be more reliably removed and optical coupling can be performed.

Details of Embodiment of Present Disclosure

Specific examples of an optical connection structure, a first optical connector (male-type connector), a second optical connector (female-type connector), and an optical connecting method according to embodiments of the present disclosure will be described below with reference to the drawings. The present invention is not limited to the following examples. The present invention is indicated by the claims, and it is intended to include all the changes within meanings and a range equivalent to the claims. As long as a plurality of embodiments can be combined, the present invention includes combinations of arbitrary embodiments. In the following description, constituent members and the like having the same reference signs are regarded as similar members in different drawings, and description thereof may be omitted.

First Embodiment

First, a basic constitution of an optical connection structure according to the present disclosure will be described with reference to FIGS. 1 and 2A to 2C. As illustrated in FIGS. 1 and 2A to 2C, an optical connection structure 1 includes a first optical connector 100 and a second optical connector 200. The first optical connector 100 is a male-type connector holding a plurality of optical fibers 110 (first optical fibers) which each extend in a longitudinal direction. The second optical connector 200 is a female-type connector holding a plurality of optical fibers 210 (second optical fibers) which each extend in the longitudinal direction. In FIGS. 1 and 2A to 2C, the plurality of optical fibers 110 and 210 are collectively described. For example, the optical fibers 110 and the optical fibers 210 may be single-mode (SM) optical fibers. For example, each of the first optical connector 100 and the second optical connector 200 may hold forty or more optical fibers 110 and 210. The number of fibers of the first optical connector 100 and the second optical connector 200 may be 48, may be 96, may be 144, or may be 192. Each of the first optical connector 100 and the second optical connector 200 may hold a number of optical fibers such that they are disposed in a matrix shape on a surface orthogonal to the longitudinal direction (for example, refer to FIGS. 11A and 12A, and the like).

The first optical connector 100 includes the plurality of optical fibers 110, a front ferrule 120 (first front ferrule), a rear ferrule 130 (first rear ferrule), and a pair of guide pins 140. The pair of guide pins 140 are disposed inside a pair of guide holes 151 and 152 provided in the front ferrule 120 and the rear ferrule 130 and are fixed to a rear end of the rear ferrule 130 using a pin keeper or the like. Accordingly, the front ferrule 120 can slidably move with respect to the rear ferrule 130. In a state before the rear ferrule 130 moves and is closely disposed with respect to the front ferrule 120, a gap S is formed between the front ferrule 120 and the rear ferrule 130. The pair of guide pins 140 are inserted into a pair of guide holes 251 of the second optical connector 200 when the first optical connector 100 is connected to the second optical connector 200. Accordingly, positioning of the first optical connector 100 and the second optical connector 200 is performed. Namely, due to the guide pins 140 and the guide holes 251, positioning of each of distal ends of the optical fibers 110 held by the first optical connector 100 and each of distal ends of the optical fibers 210 held by the second optical connector 200 is performed. The pair of guide pins 140 may be fixed to an intermediate portion of the rear ferrule 130 and disposed toward the front ferrule 120 or may be fixed between the rear ferrule 130 and the front ferrule 120 and disposed toward the front ferrule 120.

The front ferrule 120 includes a front end surface 121 (first front end surface) and a plurality of fiber holes (first fiber holes) 122. Each of the fiber holes 122 is constituted such that a distal end portion (first distal end portion) 111 of the corresponding optical fiber 110 can be moved toward an outward side (for example, the left side in FIGS. 2A to 2C) inside the hole in the longitudinal direction, and accommodates the corresponding distal end portion 111. The plurality of fiber holes 122 are provided such that the number of holes thereof corresponds to the number of fibers of the optical fibers 110. For example, the number of holes thereof is 40 or larger, may be 48, may be 96, may be 144, or may be 192. On the contrary, it may be smaller than 40. In a state before the first optical connector 100 is connected to the second optical connector 200 (refer to FIG. 2A), the distal end portions 111 of the optical fibers 110 are respectively accommodated in the fiber holes 122 such that each of the distal ends is exposed on the front end surface 121. The lengths of the fiber holes 122 in the longitudinal direction may be equal to or greater than 1 mm and equal to or less than 3 mm, for example. The aforementioned fiber holes 122 are hole parts for accommodating the respective distal end portions 111 constituted of glass fibers at the time of disconnection. The rear ferrule 130 is a member for holding the plurality of optical fibers 110 and includes a fixed portion 131 for holding the plurality of optical fibers 110. The plurality of optical fibers 110 are glass fibers coated with a resin, and they may be glass fibers in which resin coating is removed at the distal end portions 111. The lengths of such glass fiber parts in which a resin is removed may be equal to or greater than 2 mm and equal to or less than 5 mm, for example.

Figure 2B:
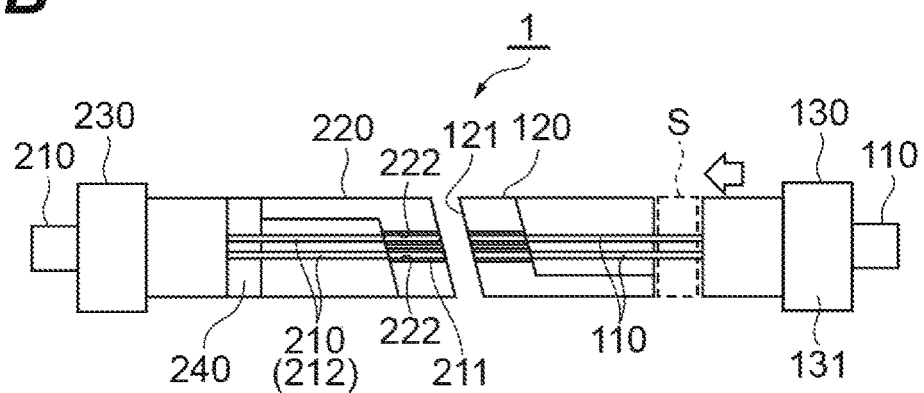
Figure 2C:
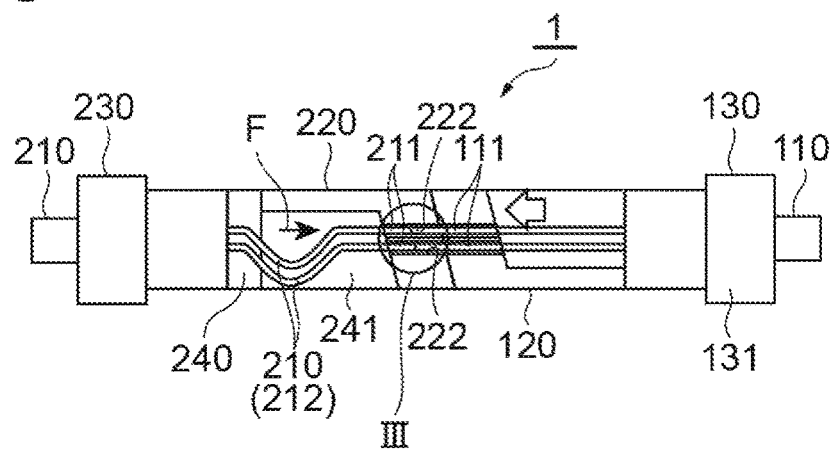

The front ferrule 120 is attached to the rear ferrule 130 so as to be able to slidably move in the longitudinal direction with respect to the rear ferrule 130. Such an attachment constitution allowing slidable movement can be realized by the pair of guide pins 140 inserted into the pair of guide holes 151 and 152 provided in the front ferrule 120 and the rear ferrule 130 respectively, different guide pins, or the like. Alternatively, it can be realized by the pair of guide pins 140 fixed to the intermediate portion of the rear ferrule 130 to be disposed toward the front ferrule 120 and inserted into the pair of guide holes 151 and 152 respectively provided in the front ferrule 120 and the rear ferrule 130; the pair of guide pins 140 fixed between the rear ferrule 130 and the front ferrule 120 to be disposed toward the front ferrule 120 and inserted into the pair of guide holes 151 provided in the front ferrule 120; or the pair of guide pins 140 also inserted into the pair of guide holes 152 provided in the rear ferrule 130; or the like. As illustrated in FIGS. 2B and 2C, when the rear ferrule 130 moves such that it becomes relatively close to the front ferrule 120 in the longitudinal direction (when the rear ferrule 130 moves toward a front of the first optical connector 100), each of the distal end portions 111 of the plurality of optical fibers 110 accommodated in each of the fiber holes 122 protrudes from the front end surface 121 outside of the fiber holes 122. Since the rear ferrule 130 holding the plurality of optical fibers 110 moves with respect to the front ferrule 120, a protruding amount of each of the distal end portions 111 protruding from the front end surface 121 is made uniform. An amount of each of the distal end portions 111 of the plurality of optical fibers 110 caused to protrude from the front end surface 121 by the first optical connector 100 when the first optical connector 100 and the second optical connector 200 are connected to each other may be 2 mm or shorter. That is, a slight amount of optical fiber protrudes from the front end surface 121. However, the protruding amounts of the distal end portions 111 of the optical fibers 110 are not limited thereto.

The second optical connector 200 includes the plurality of optical fibers 210, a front ferrule 220 (second front ferrule), a rear ferrule 230 (second rear ferrule), and a bending generation portion 240. The guide holes 251 described above and another pair of guide holes 252 are provided in the front ferrule 220 and the rear ferrule 230. Guide pins 245 are disposed inside these guide holes 251 and 252. Accordingly, positioning of the front ferrule 220 and the rear ferrule 230 is performed. However, in the second optical connector 200, the front ferrule 220 and the rear ferrule 230 are fixed to each other, and a relative distance therebetween does not change. The guide pins 245 are guide pins which are shorter than the guide pins 140.

The front ferrule 220 includes a front end surface 221 (second front end surface) and a plurality of fiber holes 222 (second fiber holes). Each of the fiber holes 222 is constituted such that a distal end portion 211 (second distal end portion) of the corresponding optical fiber 210 can be moved toward the rear (the left side in FIGS. 2A to 2C) inside the hole in the longitudinal direction. The plurality of fiber holes 222 are provided such that the number of holes thereof corresponds to the number of fibers of the optical fibers 210 or the number of holes of the plurality of fiber holes 122. For example, the number of holes thereof is 40 or larger, may be 48, may be 96, may be 144, or may be 192. On the contrary, it may be smaller than 40. In a state before the second optical connector 200 is connected to the first optical connector 100 (refer to FIG. 2A), the distal end portions 211 of the optical fibers 210 are respectively accommodated in the fiber holes 222 such that each of the distal ends is exposed on the front end surface 221. The lengths of the fiber holes 222 in the longitudinal direction may be equal to or greater than 1 mm and equal to or less than 3 mm, for example. The aforementioned fiber holes 222 are hole parts for holding parts where each of the distal end portions 111 and each of the distal end portions 211 constituted of glass fibers abut each other at the time of connection. The rear ferrule 230 is a member for holding the plurality of optical fibers 210. The front ferrule 220 is fixed to such a rear ferrule 230 and is constituted so as not be able to move. The plurality of optical fibers 210 are glass fibers coated with a resin, and they may be glass fibers in which resin coating is removed at the distal end portions 211. The lengths of such glass fiber parts in which a resin is removed may be equal to or greater than 2 mm and equal to or less than 5 mm, for example. The bending generation portion 240 is a part for holding and fixing the optical fibers 210, bending parts 212 of the optical fibers 210 when the distal end portions 211 are pushed out from the fiber holes 222 to the left side in the diagram, and generating a repulsive force due to the bending at the distal end portions 211.

Figure 3:
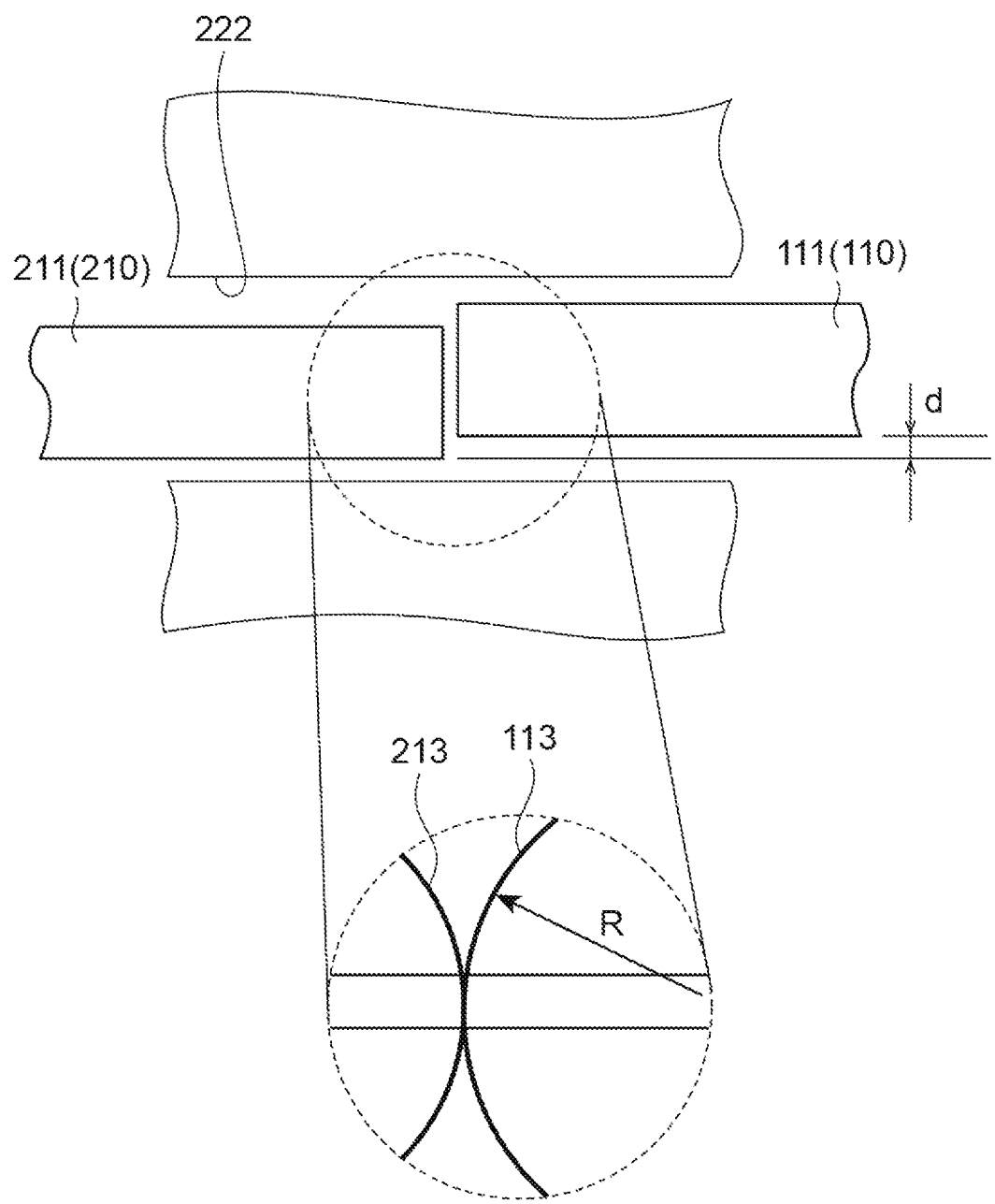
FIG. 3 is an enlarged view illustrating misalignment between distal ends of optical fibers at an optical connection place in FIG. 2C.

When the first optical connector 100 is connected to the second optical connector 200 having such a constitution, as illustrated in FIGS. 2B and 2C, each of the distal end portions 111 of the optical fibers 110 protruding from the first optical connector 100 is inserted into the corresponding fiber hole 222 of the second optical connector 200 (refer to FIG. 3). In the second optical connector 200, each of the distal end portions 211 of the plurality of optical fibers 210 is moved rearward (the left side in the diagram) inside the fiber hole 222 by each of the distal end portions 111 inserted into each of the plurality of fiber holes 222. At this time, the bending generation portion 240 of the second optical connector 200 bends the parts 212 of the optical fibers 210 leading from the distal end portions 211 in a predetermined direction (for example, downward in the diagram). A gap 241 for accommodating the parts 212 of the optical fibers 210 is provided in the bending generation portion 240. Due to a repulsive force F (refer to FIG. 2C) generated due to bending caused by this bending generation portion 240, a pressurizing force with respect to the distal end portions 111 is applied to the distal end portions 211 of the optical fibers 210. Accordingly, in this optical connection structure 1, as illustrated in FIGS. 2C and 3, when the first optical connector 100 and the second optical connector 200 are connected to each other, the distal end portions 111 of the optical fibers 110 and the distal end portions 211 of the optical fibers 210 abut each other inside the fiber holes 222 by a predetermined pressurizing force, are subjected to physical contact (PC) connection, and can be optically coupled to each other. As illustrated in FIG. 3, distal end surfaces 113 of the optical fibers 110 and distal end surfaces 213 of the optical fibers 210 may have curved surface shapes with a predetermined radius R of curvature (for example, R1 mm to R10 mm), or may have a shape inclined (for example, inclined by 8 degrees) with respect to a surface orthogonal to axes (longitudinal direction) of the fiber holes 222. Accordingly, even when the optical fibers 110 and the optical fibers 210 are PC-connected to each other, the optical fibers 110 and 210 can be optically coupled to each other with low reflection. As illustrated in FIG. 3, since the optical fibers 110 and the optical fibers 210 are connected to each other inside the fiber holes 222, an axial misalignment amount d between the optical fibers 110 and the optical fibers 210 can be reduced.

Here, with reference to FIGS. 2A to 2C, a method for connecting the first optical connector 100 and the second optical connector 200 will be described. In this connecting method, as illustrated in FIGS. 2A and 2B, the front end surface 121 of the first optical connector 100 and the front end surface 221 of the second optical connector 200 are caused to face each other, and positioning of the optical fibers 110 (distal end portions 111) and the optical fibers 210 (distal end portions 211) is performed. This positioning is positioning of the distal ends of the optical fibers 110 exposed from the front end surface 121 and the distal ends of the optical fibers 210 exposed from the front end surface 221, and it is performed by inserting the pair of guide pins 140 of the first optical connector 100 into the pair of guide holes 251 of the second optical connector 200. Before the positioning described above is performed, each of the distal end portions 111 of the plurality of optical fibers 110 exposed on the front end surface 121 and each of the distal end portions 211 of the plurality of optical fibers 210 exposed on the front end surface 221 may be cleaned using a cleaner.

Subsequently, when positioning is performed, as illustrated in FIG. 2C, in the first optical connector 100, the rear ferrule 130 is moved toward the second optical connector 200 in the longitudinal direction with respect to the front ferrule 120, and each of the distal end portions 111 of the optical fibers 110 is caused to protrude from the front end surface 121 to the outside (toward the second optical connector 200). Further, each of the distal end portions 111 protruding from the front end surface 121 is inserted into the corresponding fiber hole 222 of the plurality of fiber holes 222 of the second optical connector 200, and each of the distal end portions 211 of the optical fibers 210 are moved rearward from the front end surface 221 by each of the distal end portions 111 inserted into each of the fiber holes 222. At this time, in the second optical connector 200, the optical fibers 210 which have been pushed out rearward generate a pressurizing force (repulsive force F) against the first optical connector 100 due to the bending generation portion 240 so that the optical fibers 110 and the optical fibers 210 abut each other inside the fiber holes 222 by the predetermined pressurizing force. Accordingly, the plurality of optical fibers 110 and the plurality of optical fibers 210 are optically coupled to each other inside the plurality of fiber holes 222. Since the distal end portions 211 of the optical fibers 210 are accommodated in the fiber holes 222 in a state before connection, infiltration or adhesion of a foreign substance (dust or the like) is prevented.

In the optical connection structure 1 described above, the first optical connector 100 and the second optical connector 200 are respectively constituted as a male type and a female type differing in entire structure. However, the front ferrule 120 of the first optical connector 100 and the front ferrule 220 of the second optical connector 200 may be formed using members having the same constitution, and the rear ferrule 130 of the first optical connector 100 and the rear ferrule 230 of the second optical connector 200 may be formed using members having the same constitution. In this case, the entire constitutions of the connectors may differ from each other using a different member, for example, the bending generation portion 240.

Second Embodiment

Figure 4A:
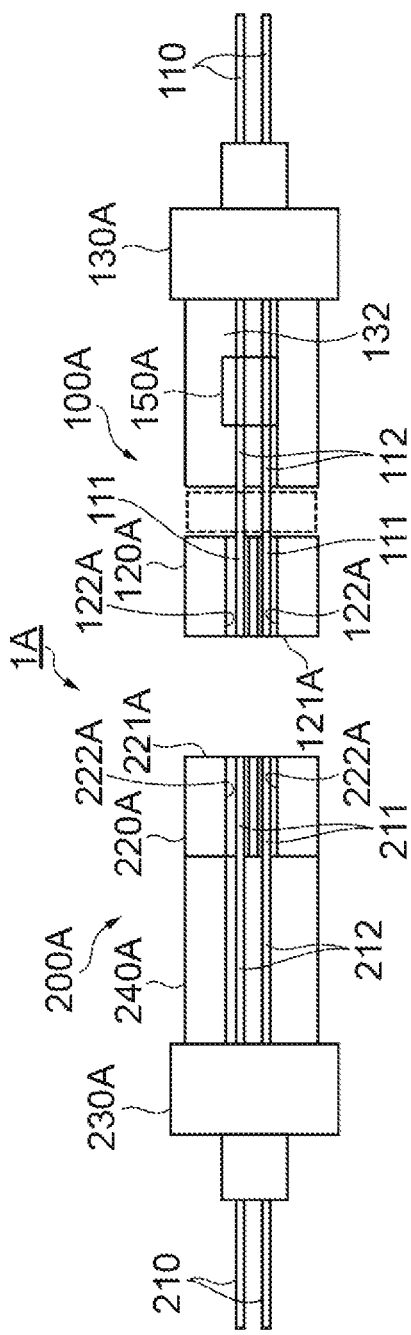
FIGS. 4A and 4B are views illustrating another example of an optical connection structure according to another embodiment of the present disclosure.
Figure 4B:
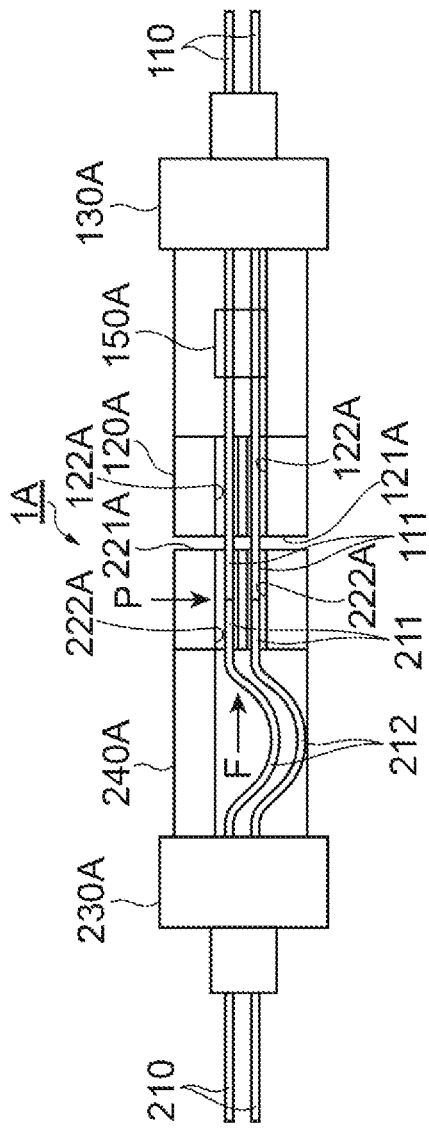
Figure 5:
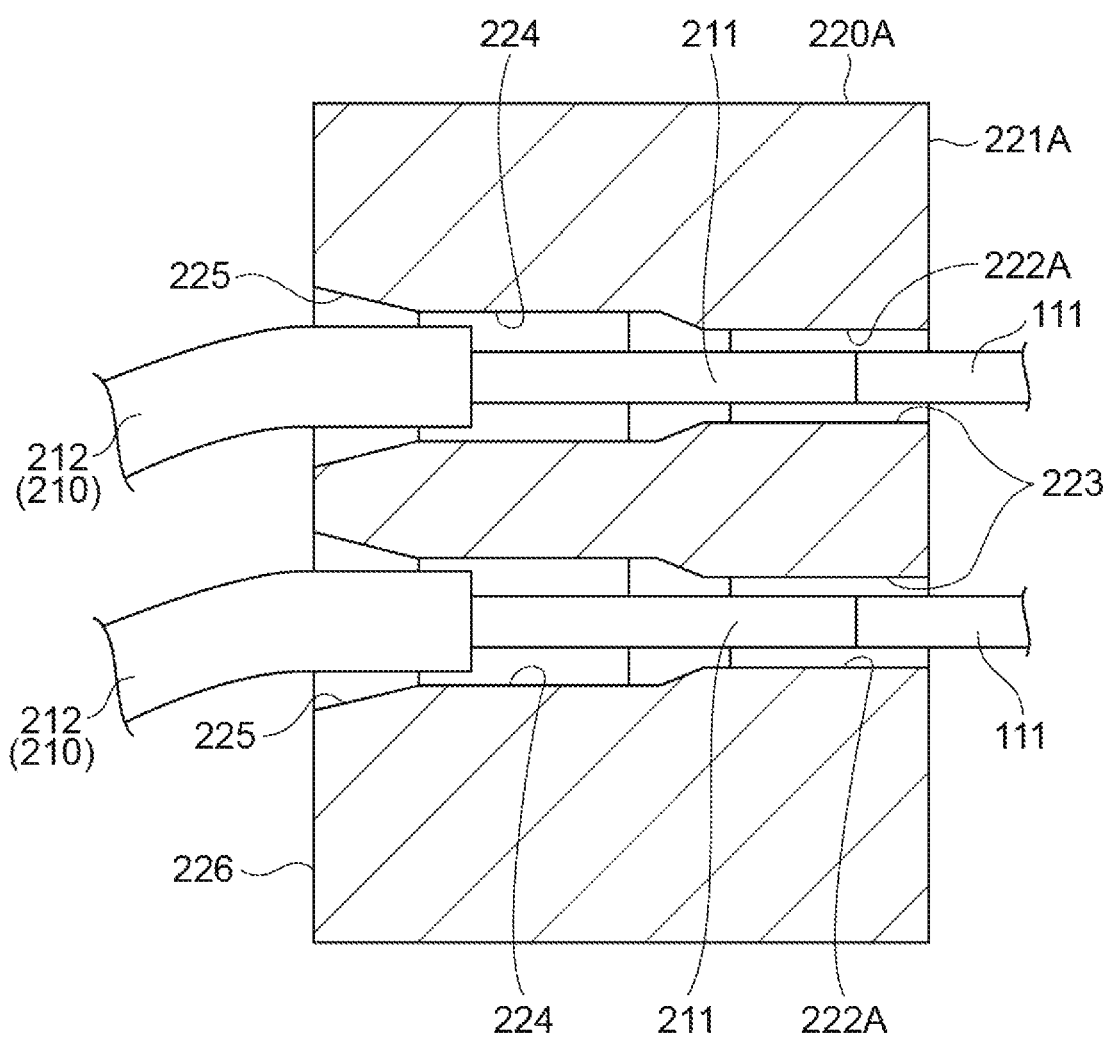
FIG. 5 is a cross-sectional view illustrating a state in which distal ends of optical fibers abut each other in the optical connection structure illustrated in FIG. 4B.

Next, with reference to FIGS. 4A, 4B, and 5, a specific constitution of an optical connection structure 1A according to another embodiment of the present disclosure will be described. FIGS. 4A and 4B are views illustrating another example of an optical connection structure according to another embodiment of the present disclosure. FIG. 5 is an enlarged cross-sectional view illustrating a state in which distal ends of optical fibers abut each other in the optical connection structure illustrated in FIG. 4B. In FIG. 4B, in order to make the diagram easy to understand, front end surfaces 121A and 221A are depicted such that they are separated from each other, but the front end surfaces 121A and 221A are actually in contact with each other. Description of constitutions similar to those of the first embodiment may be omitted. As illustrated in FIGS. 4A and 4B, the optical connection structure 1A includes a first optical connector 100A and a second optical connector 200A. The first optical connector 100A is a male-type connector and holds the plurality of optical fibers 110. The second optical connector 200A is a female-type connector and holds the plurality of optical fibers 210.

Similar to the first optical connector 100 of the first embodiment, the first optical connector 100A includes the plurality of optical fibers 110, a front ferrule 120A (first front ferrule), a rear ferrule 130A (first rear ferrule), and a pair of guide pins (not illustrated). The guide pins of the first optical connector 100A are similar to the guide pins 140 of the first embodiment.

The front ferrule 120A includes the front end surface 121A (first front end surface) and a plurality of fiber holes 122A and has a function substantially similar to that of the front ferrule 120. That is, the front ferrule 120A accommodates the distal end portions 111 of the optical fibers 110 inside fiber holes 122A in a movable state, and is movable with respect to the rear ferrule 130A. The front end surface 121A of the front ferrule 120A is formed along a surface orthogonal to an axial direction of the fiber holes 122A, and the distal ends of the distal end portions 111 of the optical fibers 110 accommodated in the fiber holes 122A are exposed on the front end surface 121A. Due to such a constitution, the distal ends of the optical fibers 110 can be easily cleaned. For example, the front ferrule 120A having such a constitution can be formed of a resin material such as polyetherimide (PEI), polyphenylene sulfide (PPS), or polycarbonate (PC). When a PEI resin is used, deterioration in strength of the optical fibers 110 can be prevented, or scratch in the front ferrule 120A can be prevented. The front ferrule 120A may be formed of a glass or a metal. The rear ferrule 130A (which will be described below) can also be formed of a similar resin material or the like.

The rear ferrule 130A includes a part for holding and fixing the optical fibers 110 similar to the rear ferrule 130 according to the first embodiment and has a region 132 for accommodating parts 112 of the optical fibers 110 extending toward the front ferrule 120A. A restriction member 150A may be provided in this region 132 such that the parts 112 of the optical fibers 110 are not bent when the rear ferrule 130A is moved forward with respect to the front ferrule 120A. Due to such a restriction member 150A, when an operation of causing each of the distal end portions 111 of the optical fibers 110 to protrude from the front end surface 121A to the outside is performed, bending of the parts 112 of the optical fibers 110 leading to the respective distal end portions 111 can be restricted (a bending amount can be reduced). Variation of amounts of the optical fibers 110 protruding from the front end surface 121A can be eliminated and the protruding amounts can be made uniform by restricting bending in this manner. The parts 112 of the optical fibers 110 restricted by the restriction member 150A may be parts of optical fibers coated with a resin. In this case, damage to the glass fiber parts of the optical fibers 110 due to the restriction member 150A is curbed.

Similar to the first embodiment, the second optical connector 200A includes the plurality of optical fibers 210, a front ferrule 220A (second front ferrule), a rear ferrule 230A (second rear ferrule), and a bending portion 240A.

The front ferrule 220A includes the front end surface 221A (second front end surface) and a plurality of fiber holes 222A and has a function substantially similar to that of the front ferrule 220. That is, the front ferrule 220A accommodates the distal end portions 211 of the optical fibers 210 inside the fiber holes 222A in a movable state, and is constituted such that the distal end portions 211 of the optical fibers 210 can be moved toward the rear (the left side in FIGS. 4A and 4B) inside the holes in the longitudinal direction. In a state before the second optical connector 200A is connected to the first optical connector 100A (refer to FIG. 4A), the distal end portions 211 of the optical fibers 210 are respectively accommodated in the fiber holes 222A such that each of the distal ends is exposed on the front end surface 221A formed along a surface orthogonal to the axial direction of the fiber holes 222A. Due to such a constitution, also in the second optical connector 200A, the distal ends of the optical fibers 210 can be easily cleaned. For example, the front ferrule 220A having such a constitution can be formed of a resin material such as polyetherimide (PEI), polyphenylene sulfide (PPS), or polycarbonate (PC). When a PEI resin is used, deterioration in strength of the optical fibers 210 can be prevented, or scratch in the front ferrule 220A can be prevented. Particularly, due to a constitution in which the optical fibers 110 of a first optical connector 110A are inserted every time connection is performed, the second optical connector 210A is formed using a material having a high strength. Similar to the front ferrule 120A, the front ferrule 220A may formed of a glass or a metal. The rear ferrule 230A (which will be described below) can also be formed of a similar resin material or the like.

Similar to the rear ferrule 230 according to the first embodiment, the rear ferrule 230A is a member for holding the plurality of optical fibers 210. The front ferrule 220A is fixed to such a rear ferrule 230A and is constituted so as not to be able to move.

The bending portion 240A is provided between the front ferrule 220A and the rear ferrule 230A and accommodates the parts 212 between the distal end portions 211 of the optical fibers 210 accommodated in the fiber holes 222A of the front ferrule 220A and parts of the optical fibers 210 held by the rear ferrule 230A. In the bending portion 240A, as illustrated in FIG. 4B, when the first optical connector 100A is connected to the second optical connector 200A, the distal end portions 111 of the optical fibers 110 are inserted into the fiber holes 222A, and the optical fibers 210 move rearward, the parts 212 of the optical fibers 210 are bent in a predetermined direction. The bending portion 240A may include a bending control constitution for performing bending in such a predetermined direction. By providing a control constitution for controlling bending, even when numerous fibers are mounted, congestion of bending of the optical fibers 210 can be prevented. In the bending control constitution, the parts 212 of the optical fibers 210 may be mechanically fixed to a main body of a bending portion 240 using a component or may be fixed using an adhesive. As seen above, the distal end portions 111 of the optical fibers 110 and the distal end portions 211 of the optical fibers 210 are PC-connected at connection places P.

The length of the bending portion 240A in the longitudinal direction may be equal to or greater than 10 mm and equal to or less than 20 mm, for example, and is 15 mm as an example. Due to the length of the bending portion 240A within such a range, a predetermined repulsive force F is generated by bending the optical fibers 210 so that a load (pressurizing force) required for PC-connection between the optical fibers 210 and the optical fibers 110 can be generated, and occurrence of a bending loss in the fibers can be prevented even when the optical fibers 210 are bent. Reliability of mechanical strength of the optical fibers 210 can also be sufficiently secured. The length of this bending portion 240A can be defined as a distance between a rear end of the front ferrule 220A accommodating the distal end portions 211 of the optical fibers 210 and the distal end of the rear ferrule 230A holding the optical fibers 210.

Here, a constitution of the fiber holes 222A, in which the optical fibers 110 are inserted and the optical fibers 110 and the optical fibers 210 are optically coupled to each other, will be described in more detail with reference to FIG. 5.

As illustrated in FIG. 5, the fiber holes 222A may include a first inner diameter part 223 having a first inner diameter, a second inner diameter part 224 having a second inner diameter larger than the first inner diameter, and a tapered portion 225 expanding from the second inner diameter part 224 toward a rear end surface 226. The first inner diameter part 223 is positioned close to the first optical connector 100A, and the second inner diameter part 224 is positioned close to the bending portion 240A. When the first optical connector 100A and the second optical connector 200A are connected to each other, the distal end portions 111 of the optical fibers 110 and the distal end portions 211 of the optical fibers 210 abut and are PC-connected to each other at the first inner diameter part 223 having a small diameter. Since the inner diameter of the first inner diameter part 223 is 126 µm or shorter, for example, the distal end portions 111 and the distal end portions 211 in which each coating resin is removed so as to be in a glass fiber state (both having an outer diameter of 125 µm, for example) are PC-connected to each other without having axial misalignment. Meanwhile, the inner diameter of the second inner diameter part 224 is 260 µm or shorter, or 210 µm or shorter, for example. Thus, the resin-coated optical fibers 210 can freely move in the longitudinal direction inside the fiber holes 222A.

The tapered portion 225 is provided on the rear end of the front ferrule 220A and is formed so as to expand from the second inner diameter part 224. Accordingly, when the distal end portions 111 of the optical fibers 110 are inserted into the fiber holes 222A to move the optical fibers 210 rearward and the optical fibers 210 are bent (a repulsive force is generated), movement thereof is not hindered. When the optical fibers 210 are bent, although the optical fibers 210 immediately after they come out from the rear ends of the fiber holes 222A are directed in a direction (downward in FIG. 5) different from the longitudinal direction, occurrence of damage to outer circumferences of the optical fibers 210 is curbed due to such directing of the tapered portion. Due to the tapered portion 225, work of inserting the optical fibers 210 into the fiber holes 222A at the time of manufacturing is also easily performed. The fiber holes 222A may have tapered shapes close to the front end surface 221A of the front ferrule 220A. In this case, when the optical connectors are connected to each other, the distal end portions 111 of the optical fibers 110 can be easily inserted into the fiber holes 222A and damage to the distal end portions 111 and the front end surface 221A of the front ferrule 220A can be prevented.

Third Embodiment

Figure 6:
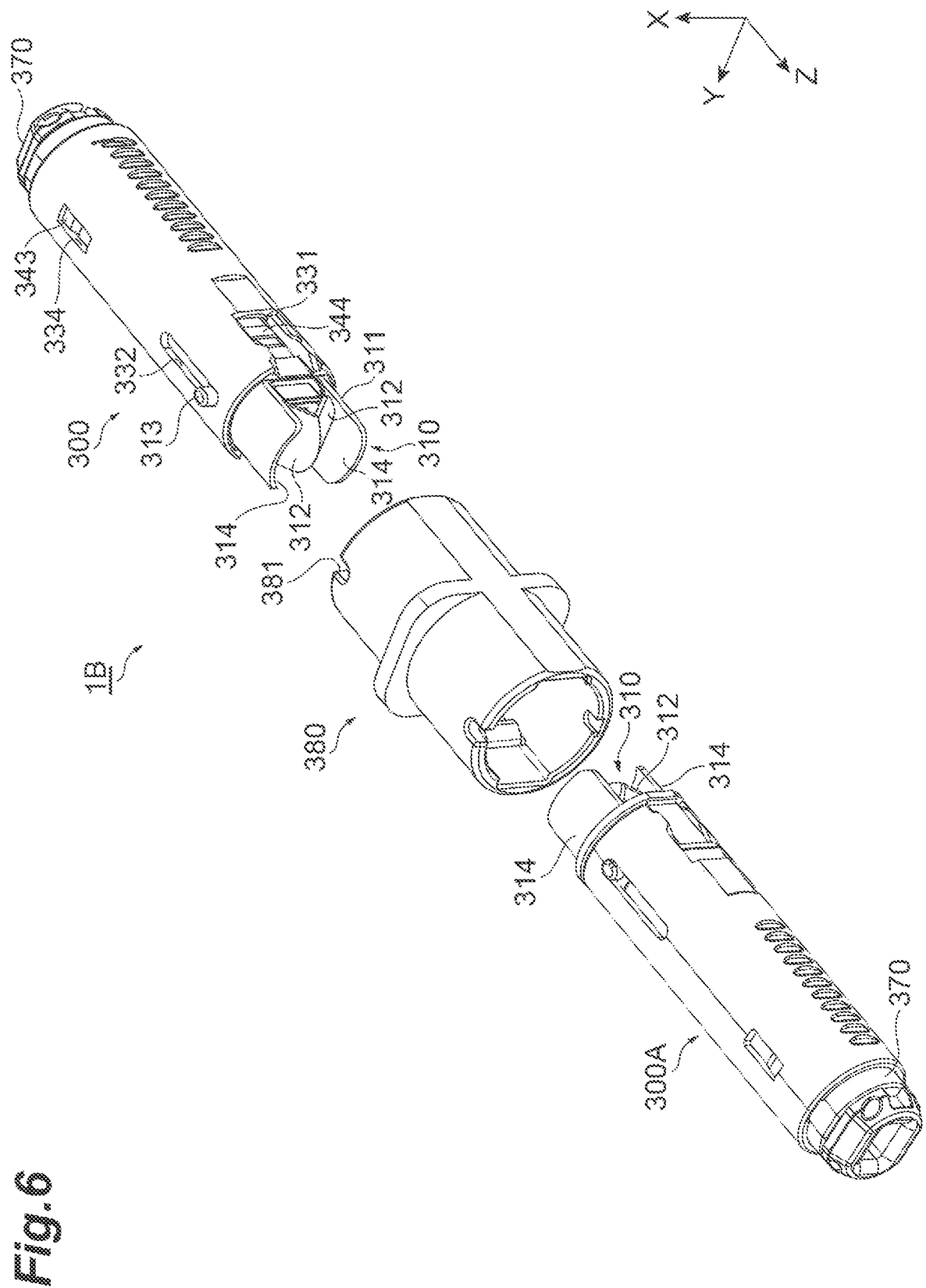
FIG. 6 is a perspective view illustrating further another example of an optical connection structure according to another embodiment of the present disclosure and illustrates first and second optical connectors and an adapter.
Figure 7:
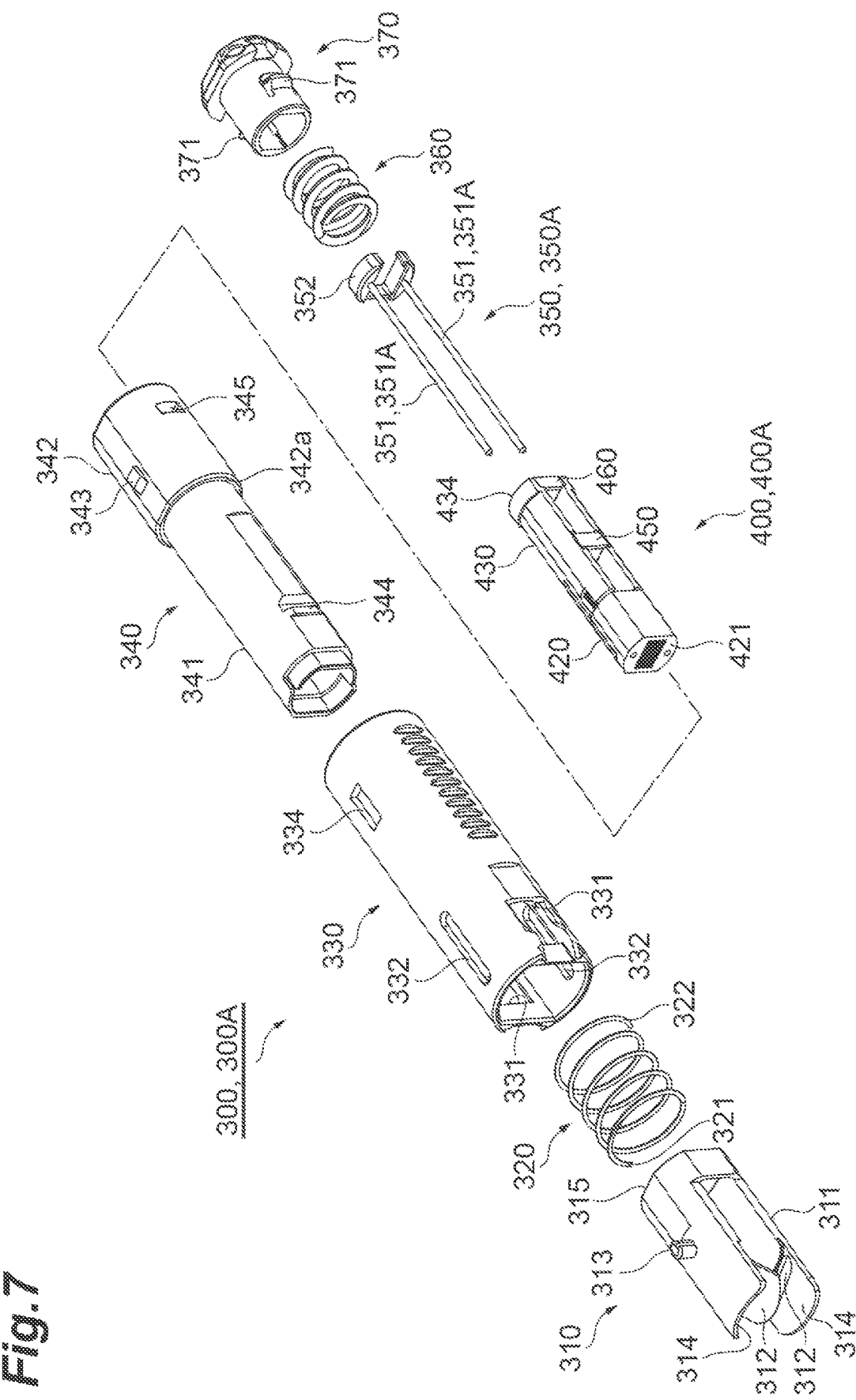
FIG. 7 is an exploded perspective view of each optical connector illustrated in FIG. 6.
Figure 8:
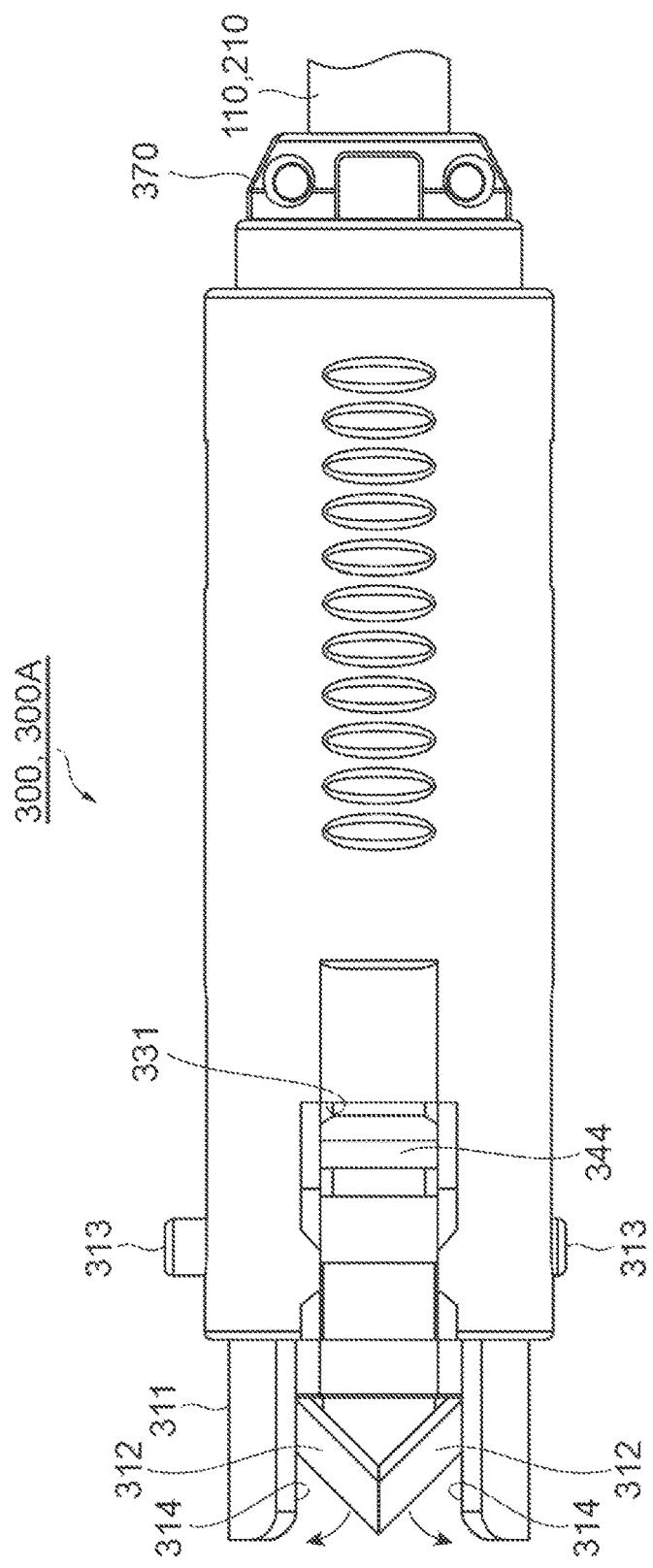
FIG. 8 is a side view illustrating a side surface of each optical connector illustrated in FIG. 6.
Figure 9:
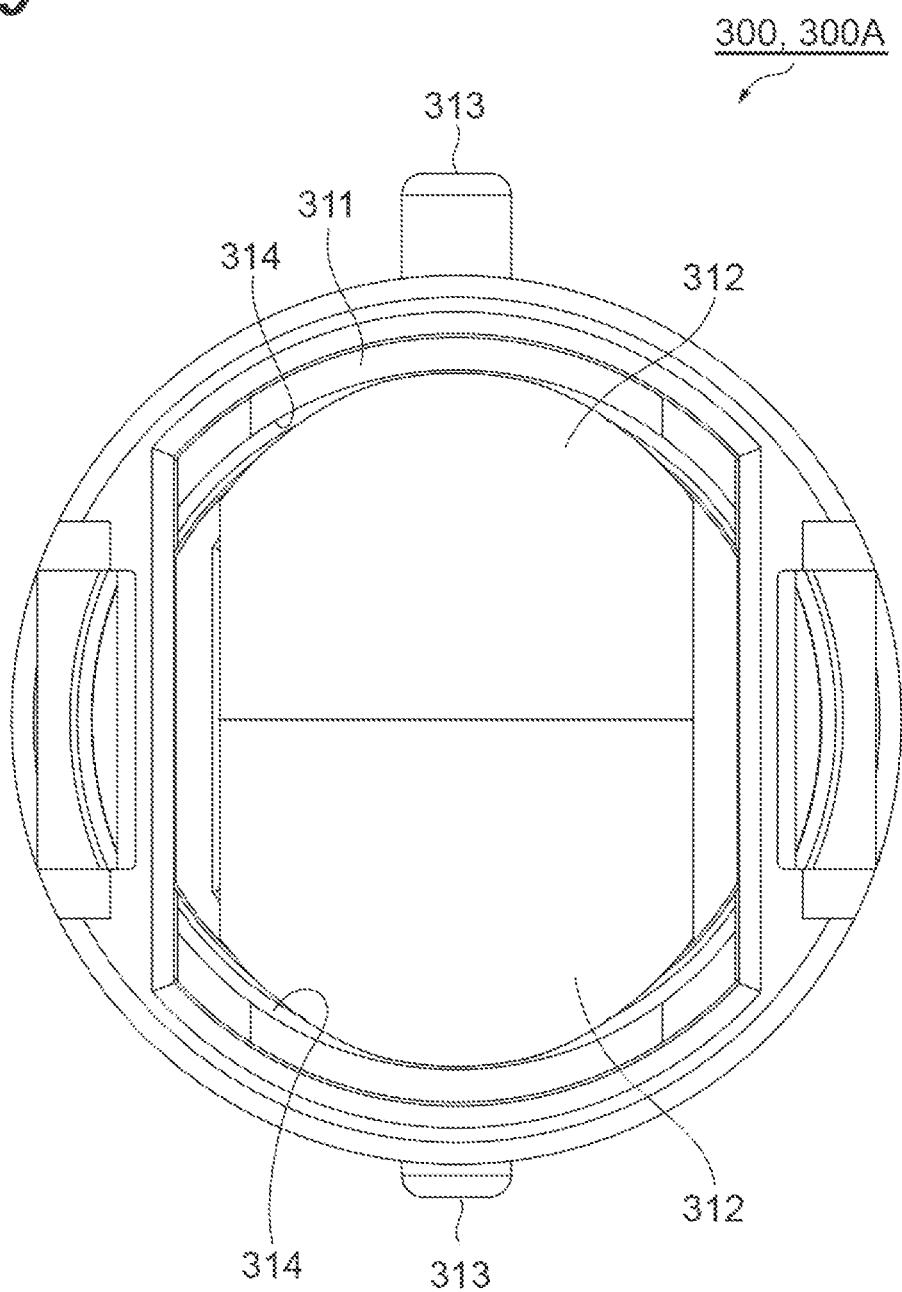
FIG. 9 is a front view illustrating a front end of each optical connector illustrated in FIG. 6.
Figure 10A:
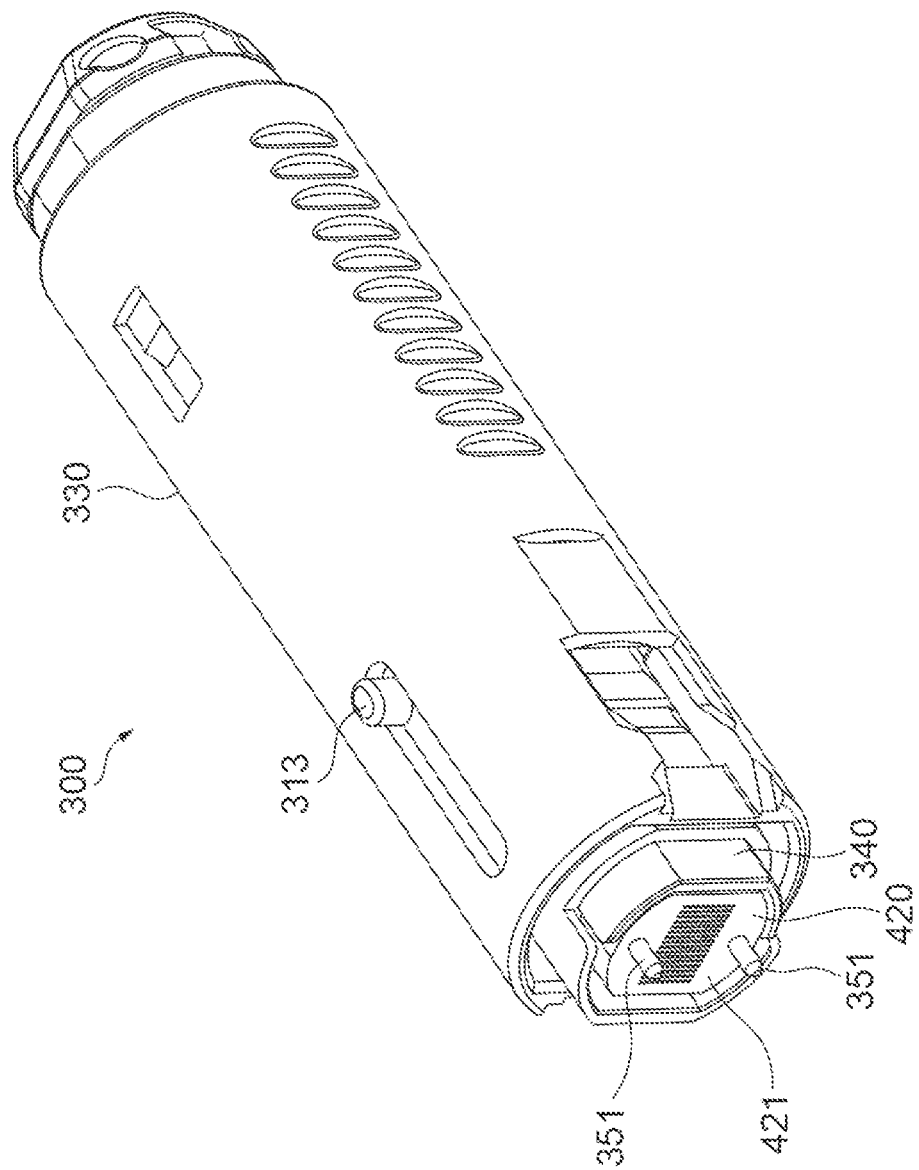
FIG. 10A is a perspective view illustrating a state in which a shutter is open in the first optical connector illustrated in FIG. 6.

Next, with reference to FIGS. 6 to 10B another optical connection structure according to a third embodiment of the present disclosure will be described. FIG. 6 is a perspective view illustrating further another example of an optical connection structure according to another embodiment of the present disclosure and illustrates first and second optical connectors and an adapter. FIG. 7 is an exploded perspective view of each of the first and second optical connectors illustrated in FIG. 6. FIG. 8 is a side view illustrating a side surface of each of the first and second optical connectors illustrated in FIG. 6. FIG. 9 is a front view illustrating a front end of each of the first and second optical connectors illustrated in FIG. 6. FIG. 10A is a perspective view illustrating a state in which a shutter is open in the first optical connector illustrated in FIG. 6. FIG. 10B is a perspective view illustrating a state in which a shutter is open in the second optical connector illustrated in FIG. 6.

As illustrated in FIG. 6, an optical connection structure 1B includes a first optical connector 300, a second optical connector 300A, and an adapter 380. The second optical connector 300A has a constitution substantially similar to that of the first optical connector 300, and different points will be described below in detail. The first optical connector 300 is a male-type connector corresponding to the optical connectors 100 and 100A in the first embodiment and the like, and the second optical connector 300A is a female-type connector corresponding to the optical connectors 200 and 200A in the first embodiment and the like. The second optical connector 300A is inserted into the adapter 380 in a direction opposite to the first optical connector 300 and is connected to the first optical connector 300 inside the adapter 380. In the examples illustrated in FIG. 6 and the like, description of a plurality of optical fibers held by the first optical connector 300 and the like is omitted. However, both the first optical connector 300 and the second optical connector 300A are connectors for holding a plurality of optical fibers (refer to FIG. 8 regarding the optical fibers 110 and 210).

As illustrated in FIGS. 7 to 10B, each of the first optical connector 300 and the second optical connector 300A includes a shutter member 310, a shutter spring 320, an outer housing 330 (grip portion), an inner housing 340, guide pins and pin keeper 350, 350A, a pressing spring 360, a rear housing 370, and a core part 400, 400A. Each of the first optical connector 300 and the second optical connector 300A has a constitution similar to a mechanism of an SC connector, for example, and can be attached and detached with respect to the adapter 380 by being pushed and pulled. Points different from an SC connector are that the shutter member 310 and the shutter spring 320 described above are provided, the core part 400, 400A has a different constitution, and the like.

The shutter member 310 is a member for covering a front end surface 421 (a first front end surface or a second front end surface) of a front ferrule 420 of the core part 400 (which will be described below in detail) and protecting the front end surface 421 from a foreign substance or the like. The shutter member 310 has a shutter main body 311 accommodating the front ferrule 420 on an inward side thereof, and a pair of shutter plates 312 turnably attached to the shutter main body 311 centering on an axis (an axis in a lateral direction) extending in a direction orthogonal to (intersecting) the longitudinal direction and covering a front end surface 411 in a state before connection. For example, the shutter main body 311 and the pair of shutter plates 312 may be constituted using elastically deformable materials. The shutter main body 311 can relatively move rearward in the longitudinal direction with respect to the front ferrule 420 of the core part 400, 400A. The pair of shutter plates 312 are constituted so as to move rotationally to be open to the outward side due to the inner housing 340 moving forward together with the front ferrule 420 when the front ferrule 420 moves forward in the longitudinal direction with respect to the shutter main body 311 (refer to FIG. 8). The pair of shutter plates 312 which have moved rotationally to the outward side are accommodated along a cutout portion 314 provided on the inward side of the front end of the shutter main body 311. A pair of projections 313 are provided on the shutter main body 311. When the first optical connector 300 is inserted into the adapter 380, the pair of projections 313 engage with reception portions 381 inside the adapter 380 and restrict forward movement of the shutter member 310. Accordingly, although forward movement of the shutter member 310 is restricted, the inner housing 340, the core part 400, 400A, and the like can further move forward.

The shutter spring 320 is a member for biasing the shutter member 310 (shutter main body 311) forward with respect to the inner housing 340 and is disposed at the outer circumference of a small diameter portion 341 of the inner housing 340. In the shutter spring 320, a front end 321 comes into contact with a rear end 315 of the shutter main body 311, and a rear end 322 comes into contact with an edge of a front end 342a of a large diameter portion 342 of the inner housing 340. The shutter spring 320 biases the shutter member 310 forward with respect to the inner housing 340.

The outer housing 330 has substantially a cylindrical shape and is a member accommodating the inner housing 340, the core part 400, 400A, the guide pins and pin keeper 350, 350A, the pressing spring 360, and the like inside thereof. A user performs an operation of the connector by gripping the outer housing 330 or the like. A pair of openings 331 are provided at a forward part of the outer housing 330. When the first optical connector 300 is inserted into the adapter 380, engagement portions 344 of the inner housing exposed from the pair of openings 331 engage with engagement reception portions of the adapter 380. Accordingly, the first optical connector 300 is connected and fixed to the adapter 380. A constitution, in which the first optical connector 300 can be detached from the adapter 380 (push-pull attachment/detachment constitution) through an operation of pulling out the outer housing 330 (retreating with respect to the adapter 380) after the pair of engagement portions 344 are connected, is provided at edges of the openings 331. Detailed description thereof will be omitted. Long holes 332 in which the pair of projections 313 of the shutter member 310 are respectively disposed and can slidably move in the longitudinal direction (axial direction), are formed at a forward part of the outer housing 330.

Engagement holes 334 with which a pair of engagement projections 343 (description of one thereof will be omitted) of the inner housing 340 engage from the inward side, are provided at the rear part of the outer housing 330. When the pair of engagement projections 343 of the inner housing 340 engage with these engagement holes 334 from the inward side, the inner housing 340 is attached to the outer housing 330. However, the engagement holes 334 are formed such that the lengths in the longitudinal direction become longer than those of the engagement projections 343, and the inner housing 340 can slightly move in a forward-rearward direction in the longitudinal direction with respect to the outer housing 330.

The inner housing 340 has substantially a cylindrical shape. As described above, the inner housing 340 includes the small diameter portion 341 and the large diameter portion 342 and accommodates the core part 400 and the guide pins and pin keeper 350 inside thereof. The inner housing 340 includes the pair of engagement portions 344 on the outer circumference of the small diameter portion 341. As described above, the engagement portions 344 are constituted so as to be exposed from the openings 331 of the outer housing 330 to the outward side and engage with the engagement reception portions of the adapter 380. This engagement is canceled when disengagement portions provided on the outward side of the openings 331 of the outer housing 330 function. Detailed description thereof will be omitted.

A pair of engagement holes 345 are provided on the rear part of the inner housing 340 independently from the engagement projections 343. A pair of projections 371 of the rear housing 370 engage with the pair of engagement holes 345. When the pair of projections 371 engage with the pair of engagement holes 345, the core part 400, 400A and the like are accommodated inside the inner housing 340 in a state in which the pressing spring 360 biases the guide pins and pin keeper 350, 350A and the core part 400, 400A forward by the rear housing 370. The core part 400, 400A which has been biased forward is interlocked when a rear end part 434 of the core part 400, 400A engages with the projections or the like in an inner hole of the inner housing 340.

The core part 400, 400A includes the front ferrule 420 and a rear ferrule 430. The core part 400, 400A is a member for holding the plurality of optical fibers 110 or 210. The front ferrule 420 is a member having a function similar to those of the front ferrules 120 and 220 of the first embodiment and the front ferrules 120A and 220A of the second embodiment, and the rear ferrule 430 is a member having a function similar to those of the rear ferrules 130 and 230 of the first embodiment and the rear ferrules 130A and 230A of the second embodiment. The core part 400, 400A will be described below in detail.

The guide pins and pin keeper 350, 350A are members for performing positioning on a surface orthogonal to the axial direction when the first optical connector 300 is connected to the second optical connector 300A and is constituted such that guide pins 351 are inserted into the guide holes 423 of the core part 400A formed in the second optical connector 300A (see FIG. 10B). In the guide pins 351, 351A, rear ends thereof are fixed to a pin keeper 352. When the optical connector is used as a male-type first optical connector 300, the guide pins 351 pass through the insides of the guide holes 423 provided inside the core part 400 and protrude from the front end surface 421 of the core part 400. Meanwhile, when the optical connector is used as a female-type second optical connector 300A, the guide pins 351A become guide pins shorter than the case of being used in the first optical connector 300 (see FIG. 13B), and lengths to an extent that the guide pins 351 of the first optical connector 300 of the counterpart can be inserted are provided on the distal end of the guide holes 423 as the lengths thereof without protruding from the front end surface 421 of the core part 400A.

The pressing spring 360 is a member for biasing the guide pins and pin keeper 350, 350A and the core part 400, 400A forward.

The rear housing 370 is a member accommodating the pressing spring 360 and accommodating the core part 400, 400A together with the inner housing 340 inside thereof.

Figure 11A:
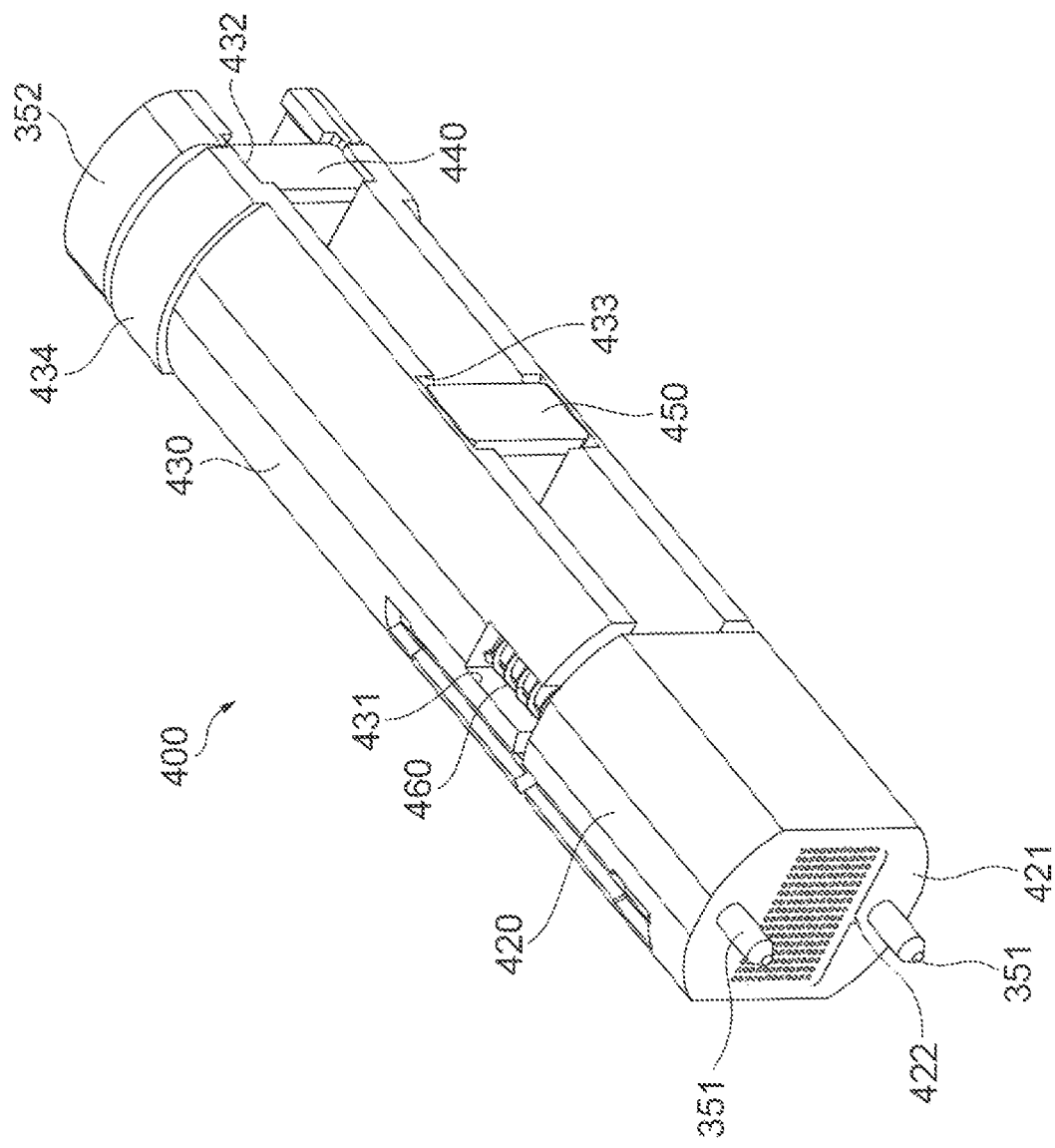
FIG. 11A is a perspective view illustrating a core part of the first optical connector illustrated in FIG. 6.
Figure 11B:
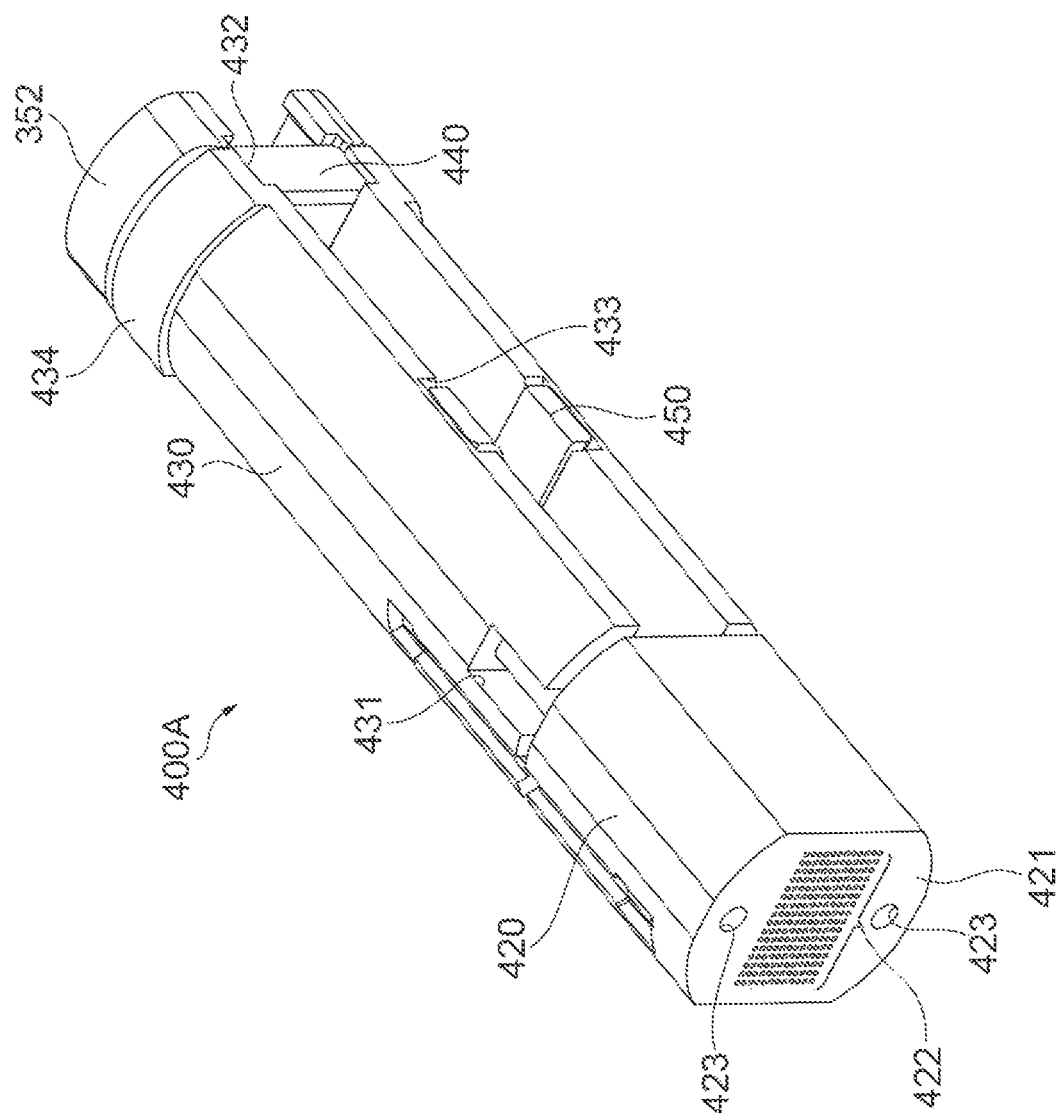
FIG. 11B is a perspective view illustrating a core part of the second optical connector illustrated in FIG. 6.
Figure 12A:
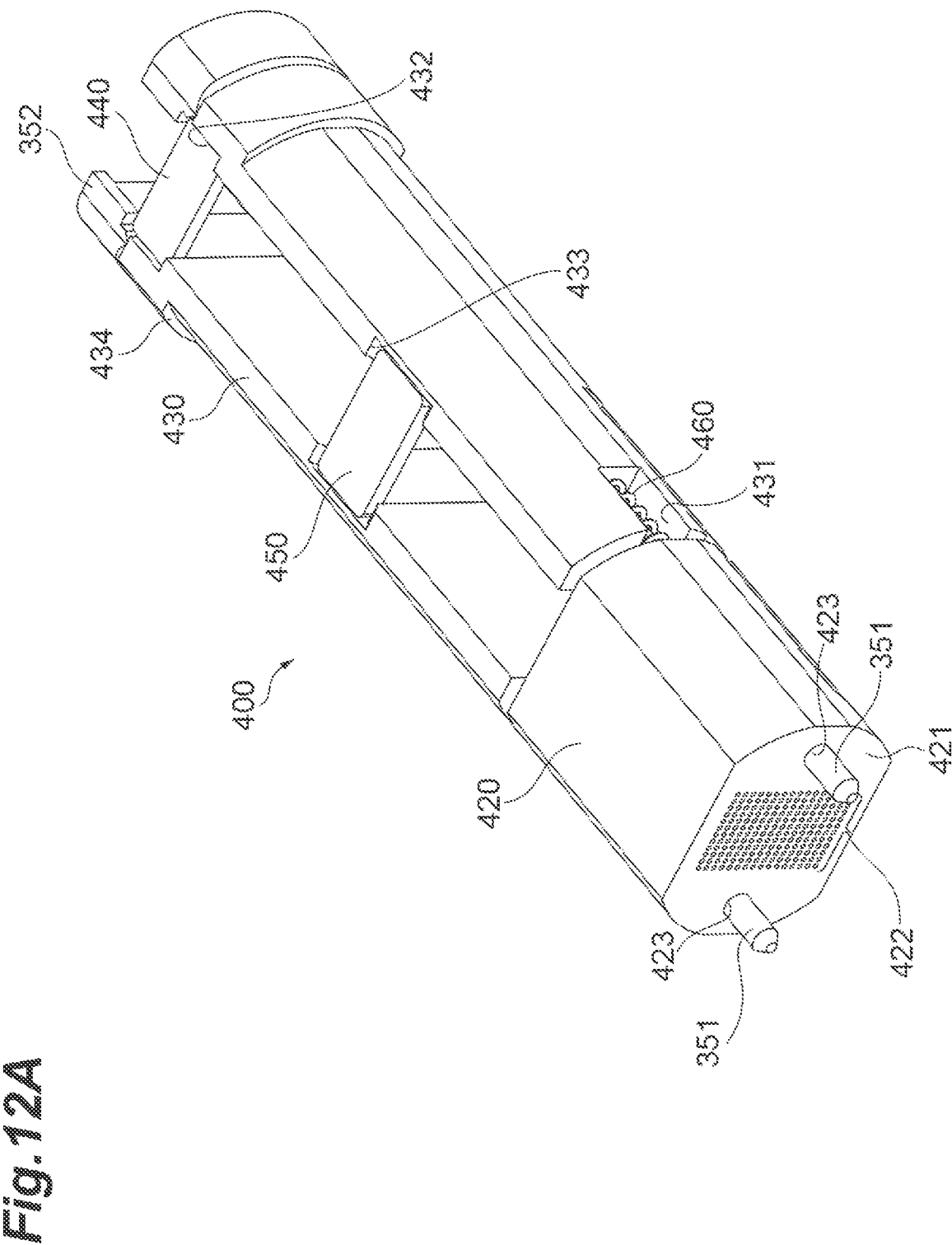
FIG. 12A is a perspective view of the core part illustrated in FIG. 11A viewed at another angle.
Figure 12B:
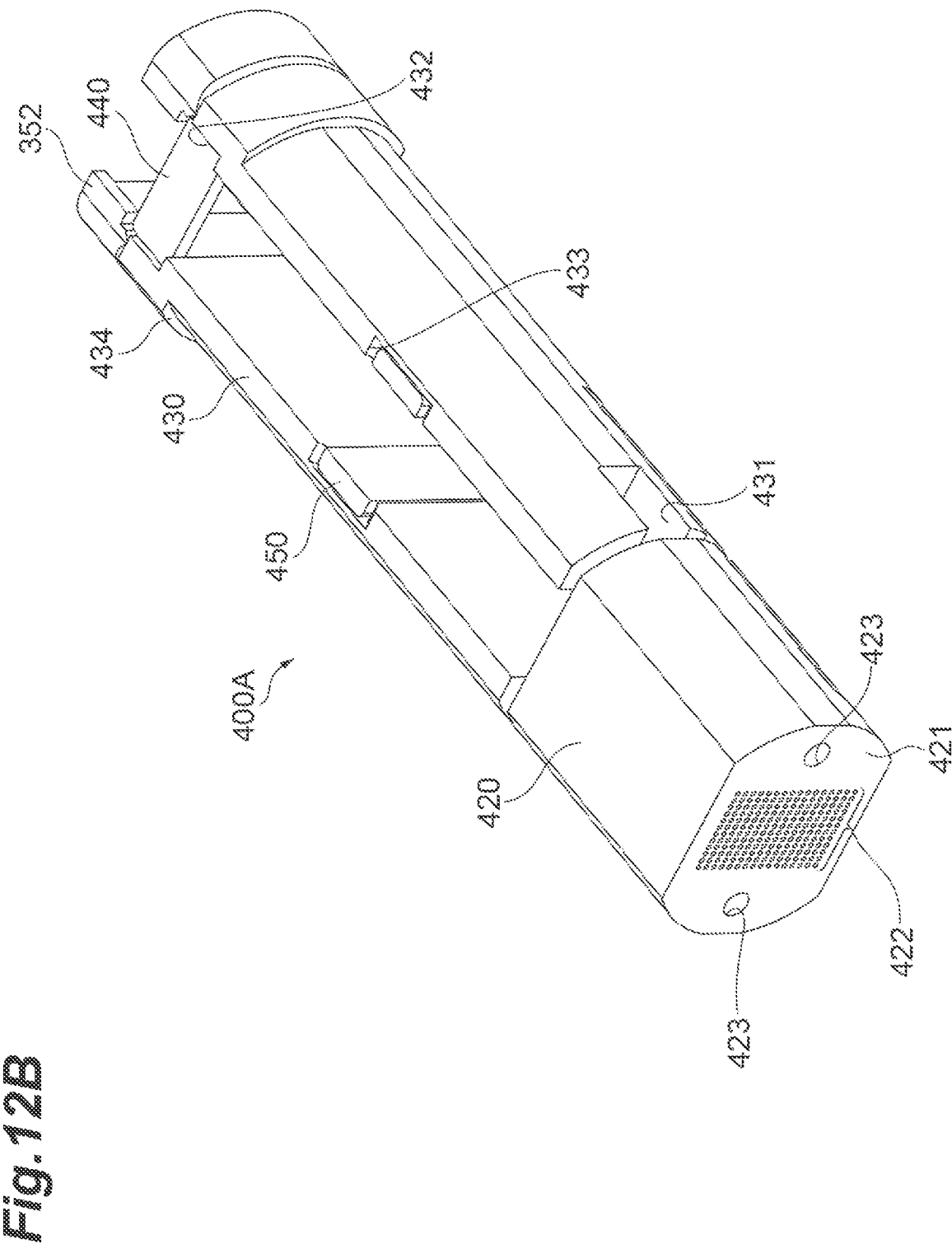
FIG. 12B is a perspective view of the core part illustrated in FIG. 11B viewed at another angle.
Figure 13B:
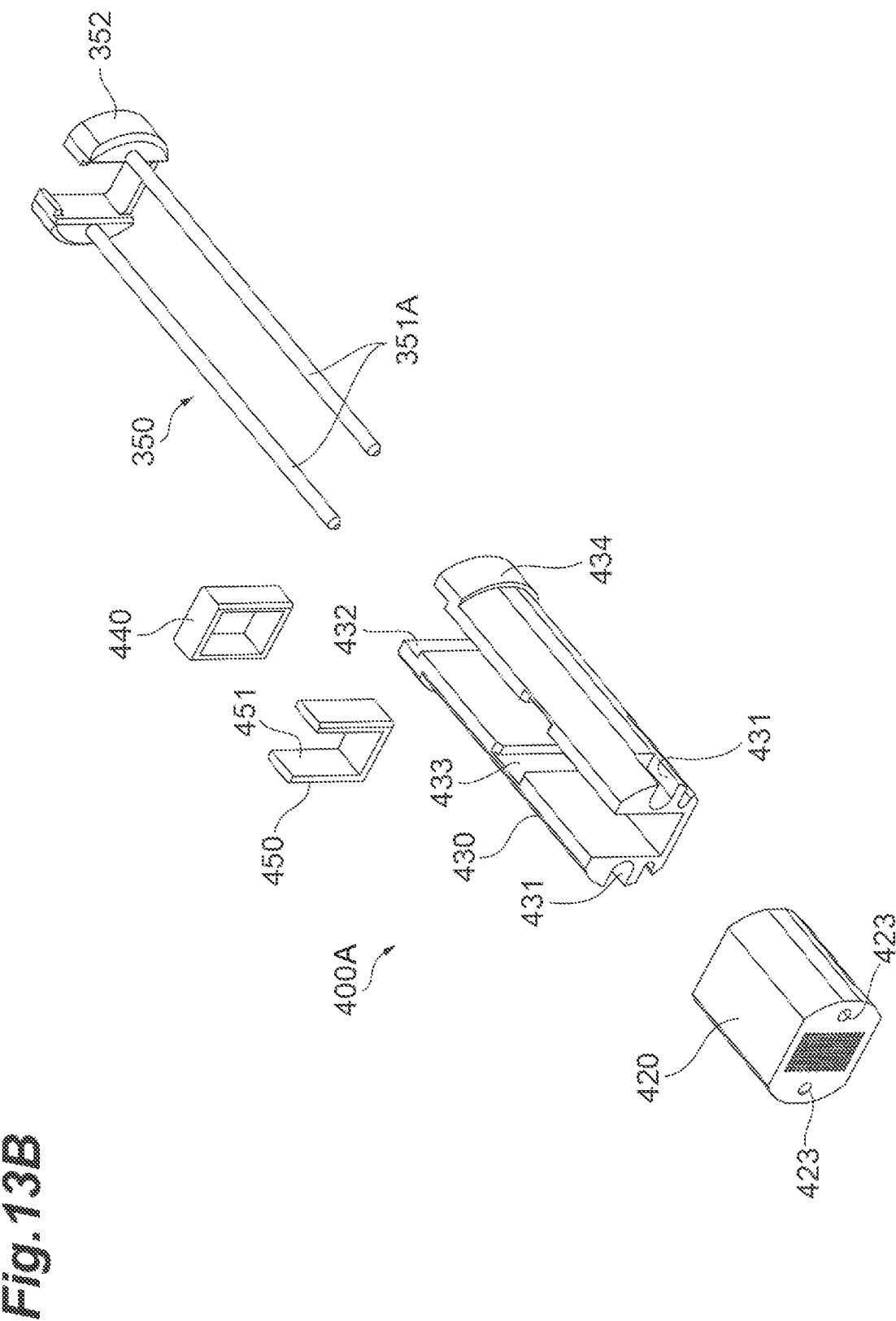
FIG. 13B is an exploded perspective view of the core part illustrated in FIGS. 11B and 12B.

Next, with reference to FIGS. 11A to 13B, a detailed constitution of the core part 400, 400A will be described. FIG. 11A is a perspective view illustrating a core part of the first optical connector. FIG. 11B is a perspective view illustrating a core part of the second optical connector. FIG. 12A is a perspective view of the core part shown in FIG. 11A, viewed at another angle. FIG. 12B is a perspective view of the core part shown in FIG. 11B, viewed at another angle. FIG. 13A is an exploded perspective view of the core part shown in FIGS. 11A and 12A. FIG. 13B is an exploded perspective view of the core part show in FIGS. 11B and 12B. In the diagrams illustrated in FIGS. 11A to 13B, the guide pins and pin keeper 350, 350A are also illustrated. As illustrated in FIGS. 11A to 13B, the core part 400, 400A includes the front ferrule 420 (the first front ferrule or the second front ferrule), and the rear ferrule 430 (the first rear ferrule or the second rear ferrule). In FIGS. 11A, 12A and 13A, a case in which the core part 400 is used in a male-type first optical connector 300 is described. However, as shown in FIGS. 11B, 12B and 13B, the core part 400A is constituted to be able to be used in a female-type second optical connector 300A as it stands by changing the lengths or the like of the guide pins 351 (in the case of a female-type second connector, the lengths are reduced). A different case will be described below.

The front ferrule 420 includes the front end surface 421 (the first front end surface or the second front end surface), a plurality of fiber holes (first fiber holes or second fiber holes) 422, and a pair of guide holes 423. Each of the fiber holes 422 accommodates the distal end portion of the corresponding optical fiber 110 or 210 (refer to FIG. 8). For example, the fiber holes 422 include 192 holes. The distal end portions of the optical fibers 110 and 210 are respectively accommodated in the fiber holes 422 such that each of the distal ends is exposed on the front end surface 421 in a state before the first optical connector 300 is connected to the second optical connector 300A.

The rear ferrule 430 has a tubular shape extending in the longitudinal direction and having at least one opening. For example, it exhibits a U-shaped cross section. Similar to the first embodiment and the like, when the rear ferrule 430 is used in a male-type first connector, the rear ferrule 430 is attached to the front ferrule 420 so as to be able to relatively move with respect to the front ferrule 420. In such a rear ferrule 430, a pair of cutouts 431 are provided on the outer circumference at the forward part. When the core part 400 is used in a male-type first optical connector, it is constituted such that springs 460 are disposed in the pair of cutouts 431 so that the rear ferrule 430 can return when it has moved with respect to the front ferrule 420. Meanwhile, when the core part 400A is used in a female-type second optical connector 300A, there is no need to dispose springs in the cutouts 431, and the rear ferrule 430 is fixed such that it does not move with respect to the front ferrule 420.

Cutouts 432 and 433 are further provided on the inward side of the rear ferrule 430, and a first member 440 and a second member 450 are inserted and disposed therein. The first member 440 is a frame-shaped member and fixes the plurality of optical fibers 110 or 210 to the first member 440 by collectively accommodating the plurality of optical fibers 110 or 210 (for example, a number of (192) optical fibers having a coating resin) on the inward side. As necessary, the plurality of optical fibers 110 or 210 may be fixed to the first member 440 using an adhesive or the like. Such a first member 440 is inserted into the cutouts 432 of the rear ferrule 430. Accordingly, the plurality of optical fibers 110 or 210 are held by the rear ferrule 430.

Figure 14A:
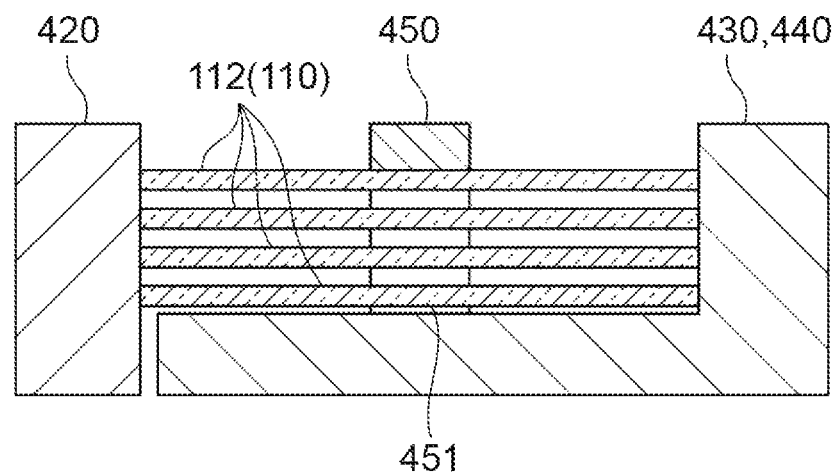
FIGS. 14A and 14B are schematic views illustrating a constitution of restricting bending of accommodated optical fibers and a constitution of controlling a bending direction of accommodated optical fibers in the core parts illustrated in FIGS. 11A, 11B, 12A and 12B.

The second member 450 is a frame-shaped member of which a part is cut out, and exhibits a U-shaped cross section, for example. When the second member 450 is disposed as in FIGS. 13A and 14A, that is, the second member 450 is disposed in a state in which an opening 451 is directed toward the rear ferrule 430, the second member 450 can function as the restriction member 150A of the optical connector 100A (male-type connector) in the second embodiment. Namely, as illustrated in FIG. 14A, it can be used as a member for restricting bending of the parts 112 of the plurality of optical fibers leading to the distal end portions 111 of the optical fibers 110 when each of the distal end portions of the plurality of optical fibers 110 protrudes from the front end surface 421 of the front ferrule 420 to the outside.

Figure 14B:
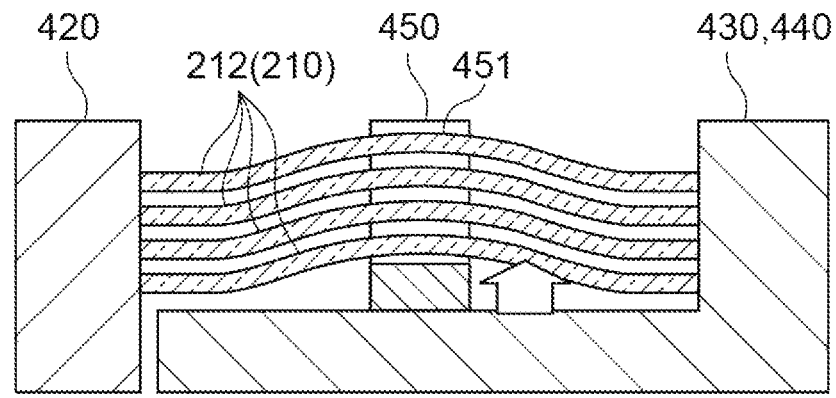

Meanwhile, when the second member 450 is disposed as illustrated in FIGS. 13B and 14B, that is, the second member 450 is disposed in a state in which the opening 451 is directed upward, the second member 450 can be used as a bending control mechanism for controlling a bending direction of the optical fibers 210 of which one side is held and fixed by the first member 440 and the other end is held the fiber holes 422. Namely, the second member 450 can be used as a bending restriction structure in the female-type second optical connector 300A.

In this manner, in an optical connection structure 1C according to the present embodiment, the optical connector 300, 300A including the core part 400, 400A described above has a constitution which can be used for both the first optical connector 100 (male-type connector) and the second optical connector 200 (female-type connector) of the first embodiment or the like described above and has a constitution which can be used for both the first optical connector 100A (male-type connector) and the second optical connector 200A (female-type connector) of the second embodiment, by simply changing the disposition direction of the second member 450 and changing the relation between the front ferrule 420 and the rear ferrule 430 (whether they are movable or fixed). When it is used in the second optical connectors 200 and 200A, there is a need to have a constitution in which the guide pins 351A of the guide pins and pin keeper 350A are shorter than the first optical connectors 100 and 100A and corresponding guide pins 351 can be inserted without having the guide pins 351A protruding from the front end surface 421.

Figure 15A:
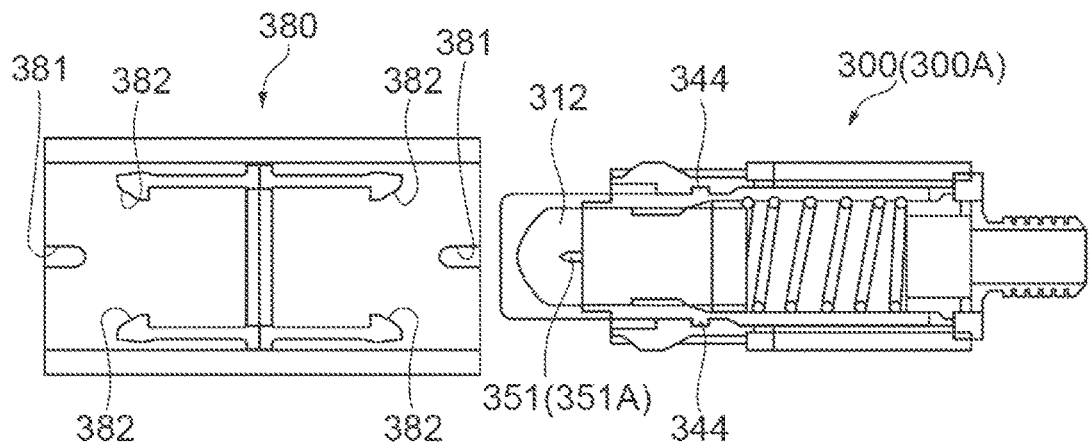
FIGS. 15A, 15B, and 15C are explanatory cross-sectional views of an operation of opening and closing the shutter when the optical connector is inserted into and engaged with the adapter in the optical connection structure illustrated in FIG. 6 and are cross-sectional views along a YZ cross section.
Figure 15B:
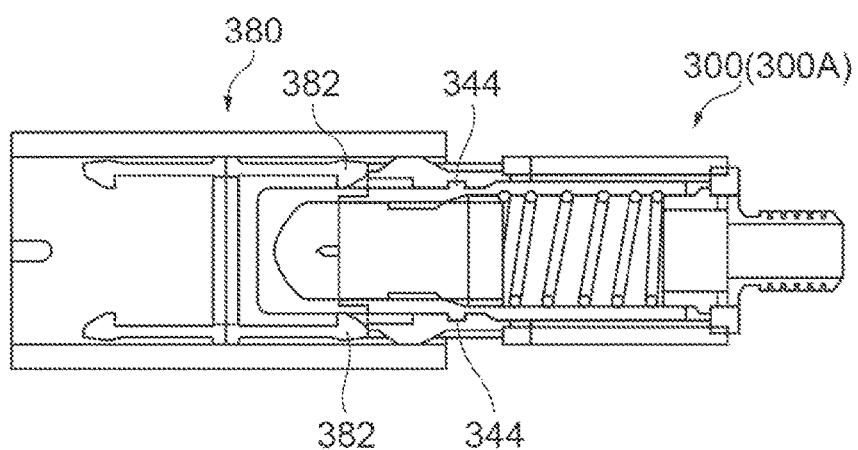
Figure 15C:
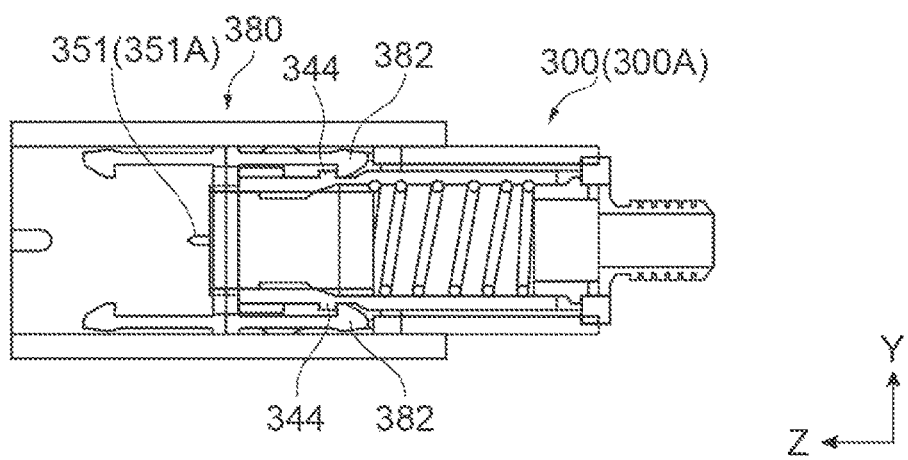
Figure 16A:
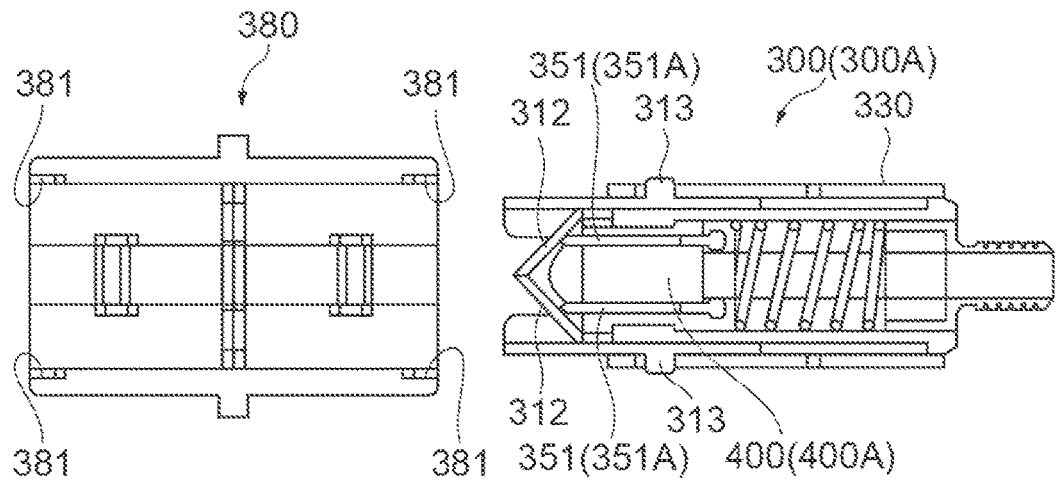
FIGS. 16A, 16B, and 16C are explanatory cross-sectional views of an operation of opening and closing the shutter when the optical connector is inserted into and engaged with the adapter in the optical connection structure illustrated in FIG. 6 and are cross-sectional views along a ZX cross section.
Figure 16B:
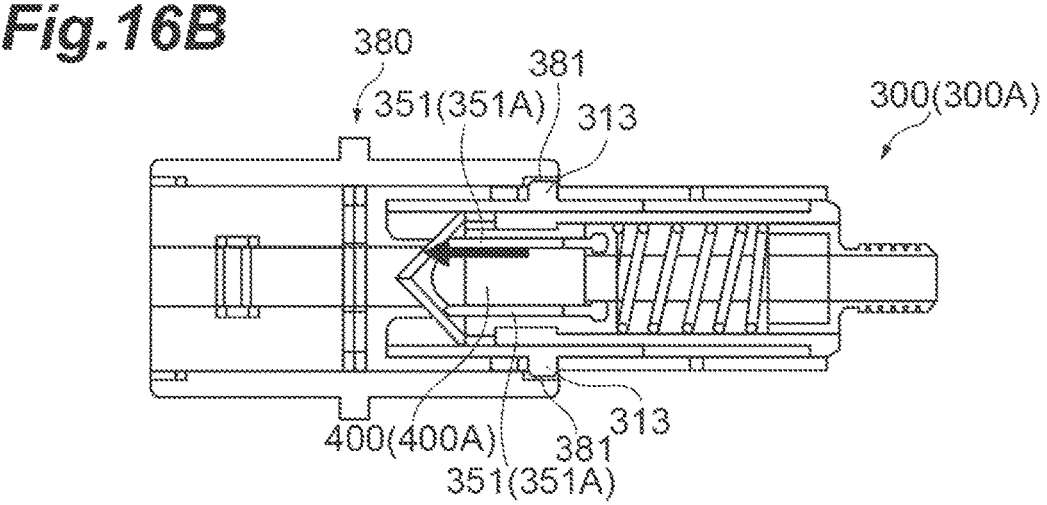
Figure 16C:
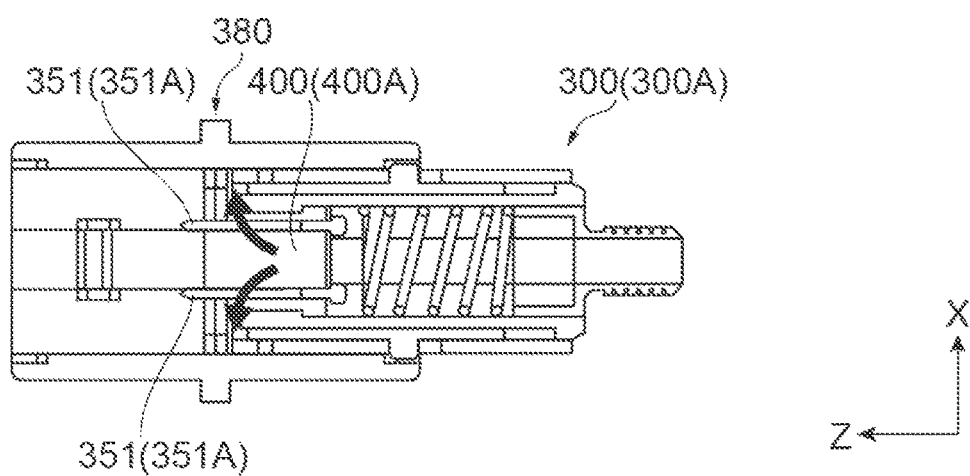

Next, an operation of opening and closing the shutter member 310 when the optical connector 300, 300A described above is inserted into the adapter 380 will be described with reference to FIGS. 15A to 15C and 16A to 16C. FIGS. 15A to 15C are explanatory cross-sectional views of an operation of opening and closing the shutter when the optical connector 300, 300A is inserted into and engaged with the adapter 380 in the optical connection structure illustrated in FIG. 6 and are cross-sectional views along a YZ cross section. FIGS. 16A to 16C are explanatory cross-sectional views of an operation of opening and closing the shutter when the optical connector 300, 300A is inserted into and engaged with the adapter in the optical connection structure illustrated in FIG. 6, and are cross-sectional views along a ZX cross section.

As illustrated in FIGS. 15A to 15C and 16A to 16C, when the optical connector 300 is moved toward the adapter 380 (refer to FIGS. 15A and 16A), the pair of projections 313 of the shutter member 310 of the optical connector 300 engage with a pair of reception portions 381 of the adapter 380. Accordingly, further forward (Z direction) movement of the shutter main body 311 of the shutter member 310 in the Z direction with respect to the adapter 380 is restricted. In this state, when the optical connector 300 is further pushed against the adapter 380, the inner housing 340 of the optical connector 300 and the core part 400 accommodated on the inward side thereof further move forward in the Z direction (refer to FIGS. 15B and 16B). At this time, the distal end of the inner housing 340 pushes the pair of shutter plates 312 of the shutter member 310 in an outer circumferential direction from the inward side so that the pair of shutter plates 312 move rotationally from the inward side toward the outward side in an upward-downward direction in FIG. 16C while having the distal end part of the inner housing 340 as an axis. The pair of rotationally moved shutter plates 312 are accommodated in the cutout portion 314 along an inner circumference of the shutter main body 311 (refer to FIGS. 16C, 9, and 10A). When this shutter is opened, the pair of engagement portions 344 of the inner housing 340 of the optical connector 300 engage with a pair of engagement reception portions 382 of the adapter 380. Accordingly, the optical connector 300 (for example, the male-type first optical connector) engages with the adapter 380 and is fixed thereto. At this time, the front side of the optical connector 300 has a constitution as illustrated in FIG. 10A, for example, and the front end surface 421 of the core part 400 is exposed on the outward side and is connected to the other optical connector (second optical connector 300A). When an optical connector 300A having a constitution similar to that of the optical connector 300 (for example, a female-type second optical connector 300A) is connected to the adapter 380 in a similar manner shown in FIGS. 15A to 15C and FIGS. 16A to 16C by being inserted from the opposite side, similar to the first embodiment and the second embodiment, the optical connector 300 (first optical connector) and the optical connector 300A (second optical connector) are optically connected to each other. At this time, since the constitution in which the optical fibers 110 are inserted into the fiber holes 422 of the second optical connector 300A and the plurality of optical fibers 110 held by the first optical connector 300 and the plurality of optical fibers 210 held by the second optical connector 300A are optically coupled to each other inside the fiber hole 422 is similar to that of the first embodiment and the second embodiment, detailed description thereof will be omitted.

Hereinabove, the embodiments of the present disclosure have been described in detail. However, the present invention is not limited to the foregoing embodiments and can be applied to various embodiments.

Modification Example 1

Figure 17:
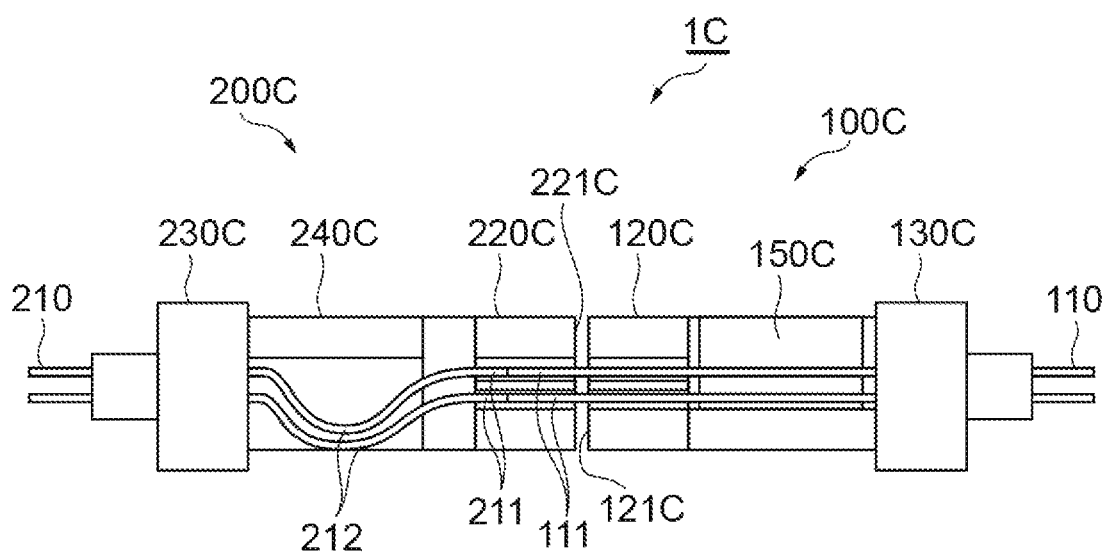
FIG. 17 is a cross-sectional view illustrating an optical connection structure according to a first modification example.
Figure 18:
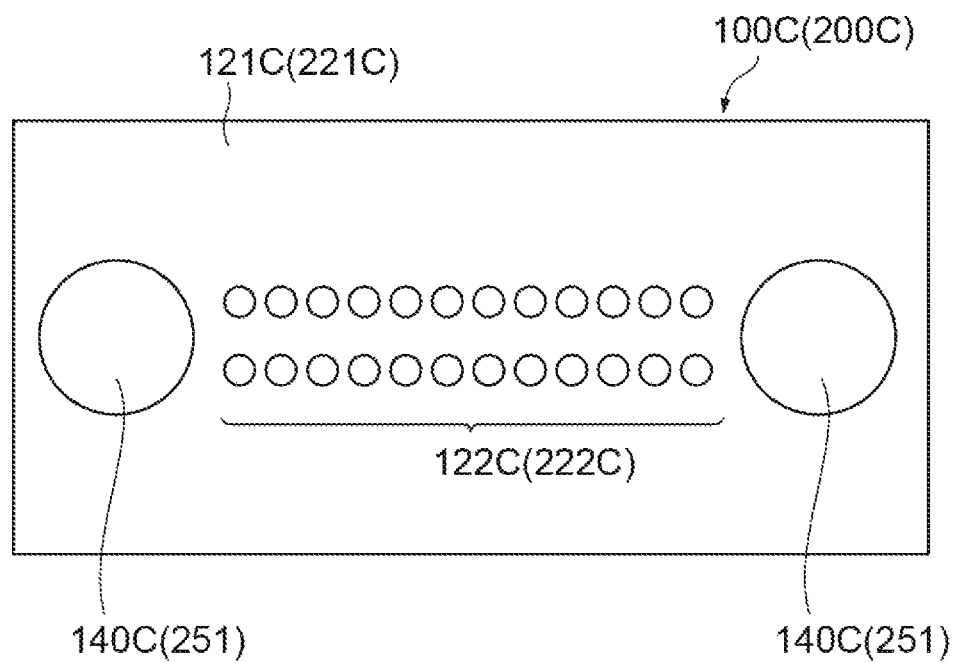
FIG. 18 is a front view illustrating a front end surface of an optical connector in the first modification example illustrated in FIG. 17.

FIGS. 17 and 18 are cross-sectional views illustrating the optical connection structure 1C according to Modification example 1. The optical connection structure 1C includes a first optical connector 1000 and a second optical connector 200C. Similar to the first embodiment and the like, the first optical connector 100C includes a front ferrule 120C and a rear ferrule 1300, and a restriction member 1500 for restricting bending of the optical fibers 110 is provided in the rear ferrule 1300. Similar to the first embodiment, the second optical connector 200C includes a front ferrule 220C and a rear ferrule 230C, and a bending portion 240C for controlling a bending direction of the optical fibers 210 is provided in the rear ferrule 230C. In this optical connection structure 1C, a front end surface 121C of the front ferrule 120C and a front end surface 221C of the front ferrule. 220C become flat surfaces parallel to a surface orthogonal to the axial direction. Each of the first optical connector 1000 and the second optical connector 200C holds 24 optical fibers 110 and 210, and the optical fibers 110 and 210 are disposed in a manner of two rows of 12 optical fibers.

Modification Example 2

Figure 19:
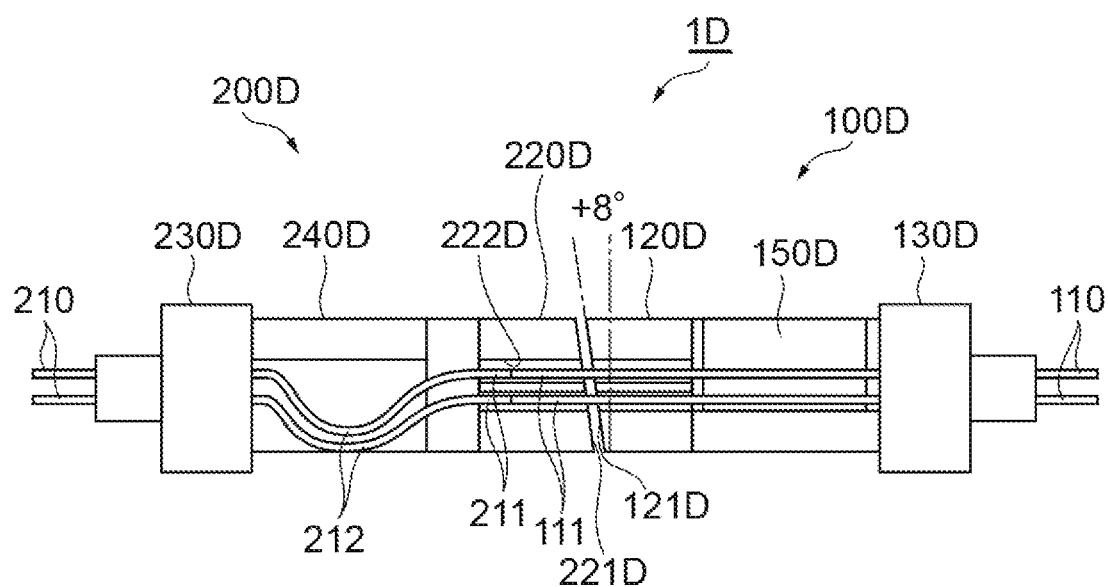
FIG. 19 is a cross-sectional view illustrating an optical connection structure according to a second modification example.
Figure 20:
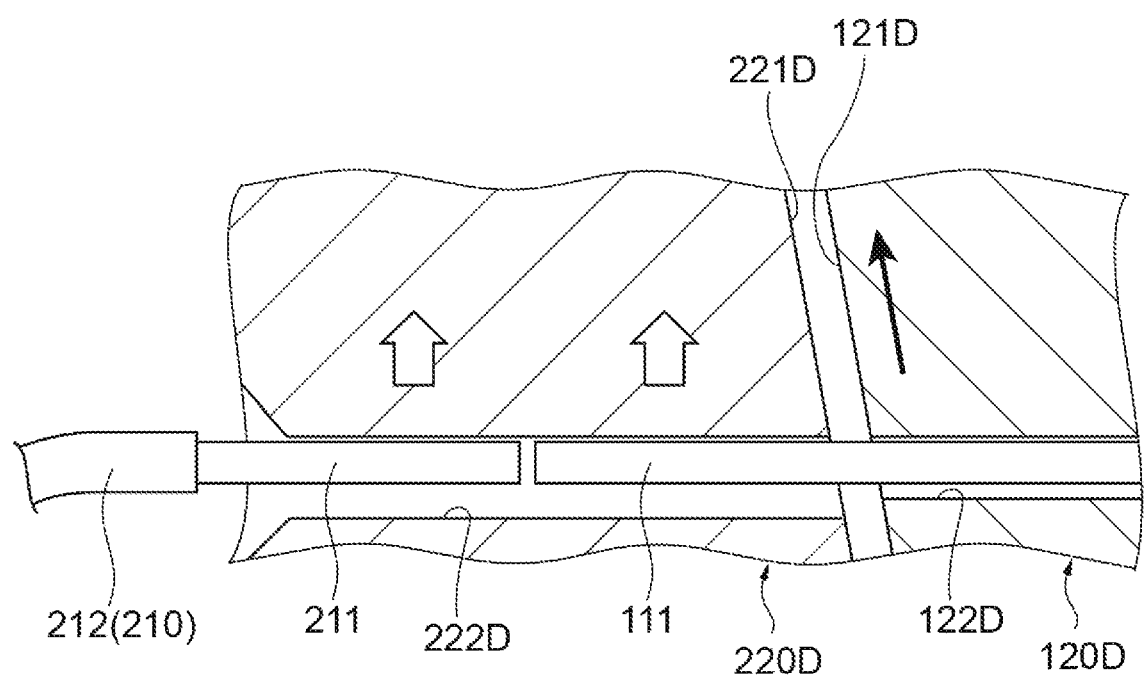
FIG. 20 is an explanatory cross-sectional view of an abutting state between optical fibers in the optical connection structure according to the second modification example.
Figure 21:
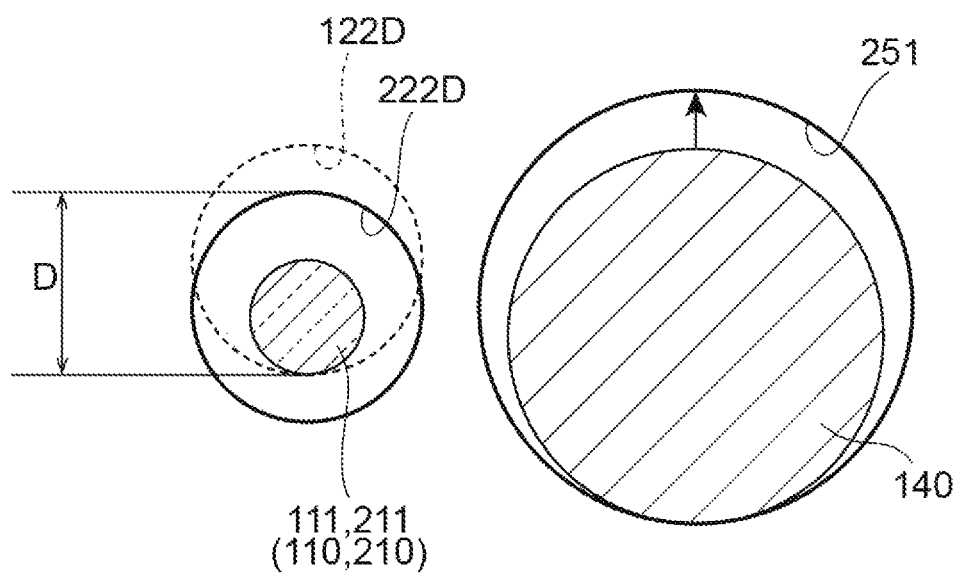
FIG. 21 is an explanatory view of a relation between a clearance between a guide pin and a guide hole and a clearance between a fiber and a fiber hole, with respect to the optical fibers abutting each other illustrated in FIG. 20.

FIGS. 19 to 21 are views illustrating an optical connection structure 1D according to Modification example 2. The optical connection structure 1D includes a first optical connector 100D and a second optical connector 200D. Similar to the first embodiment and the like, the first optical connector 100D includes a front ferrule 120D and a rear ferrule 130D, and a restriction member 150D for restricting bending of the optical fibers 110 is provided in the rear ferrule 130D. Similar to the first embodiment, the second optical connector 200D includes a front ferrule 220D and a rear ferrule 230D, and a bending portion 240D for controlling a bending direction of the optical fibers 210 is provided in the rear ferrule 230D. In this optical connection structure 1D, a front end surface 121D of the front ferrule 120D and a front end surface 221D of the front ferrule 220D become surfaces inclined with respect to a surface orthogonal to the axial direction (for example, positive 8 degrees).

In the optical connection structure 1D according to Modification example 2, as illustrated in FIGS. 20 and 21, when clearances of the optical fibers 110 and 210 with respect to fiber holes 122D and 222D are larger than clearances of the guide pins 140 with respect to the guide holes 251 (refer to FIGS. 21 and 1), as illustrated in FIG. 20, the front ferrule 120D shifts in the upward direction as much as the clearances of the guide holes 251. As a result, effective clearances of the fiber holes 222D are reduced to effective hole diameter D, axial misalignment during fiber connection can be reduced. Accordingly, in the optical connection structure 1D, a connection loss in optical connection between the optical fibers 110 and the optical fibers 210 can be reduced.

Modification Example 3

Figure 22:
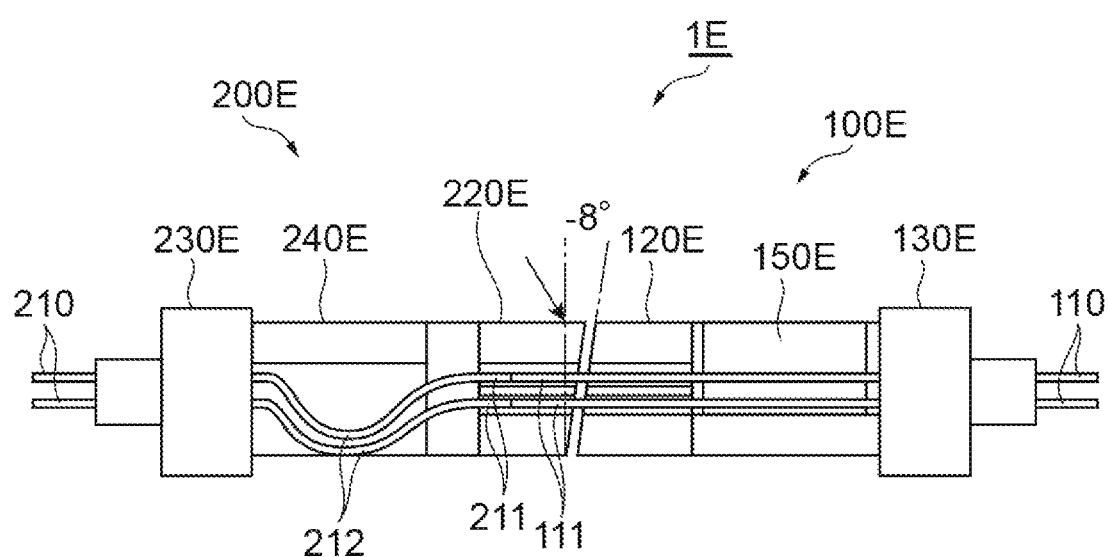
FIG. 22 is a cross-sectional view illustrating an optical connection structure according to a third modification example.
Figure 23:
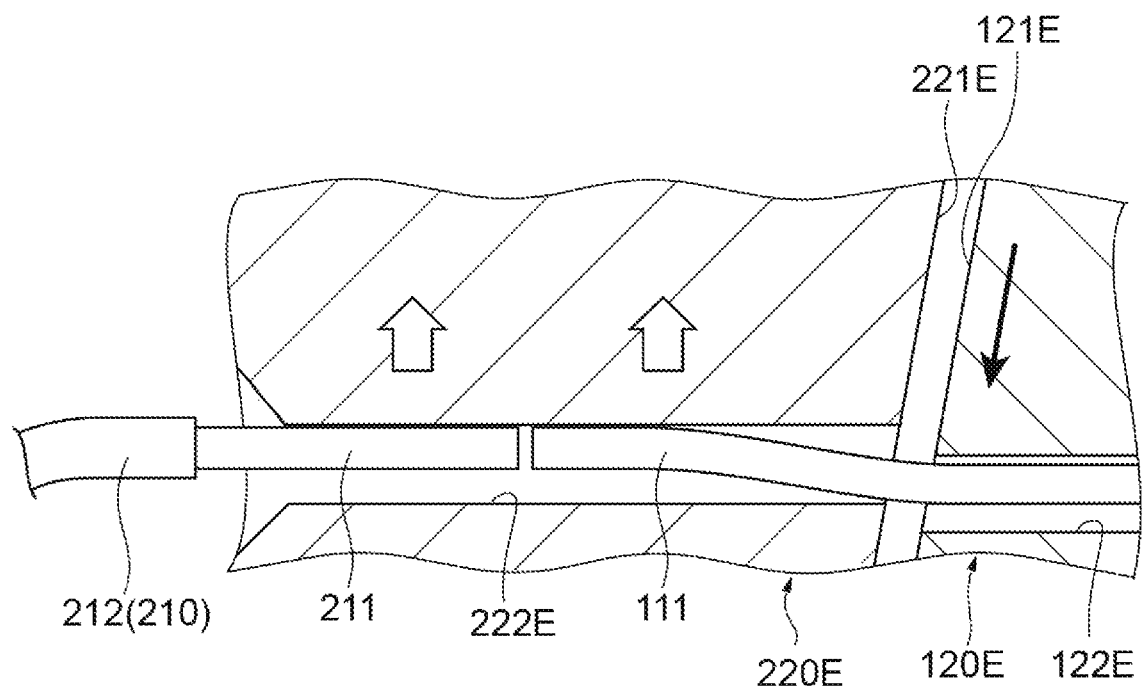
FIG. 23 is an explanatory cross-sectional view of an abutting state between optical fibers in the optical connection structure according to the third modification example.
Figure 24:
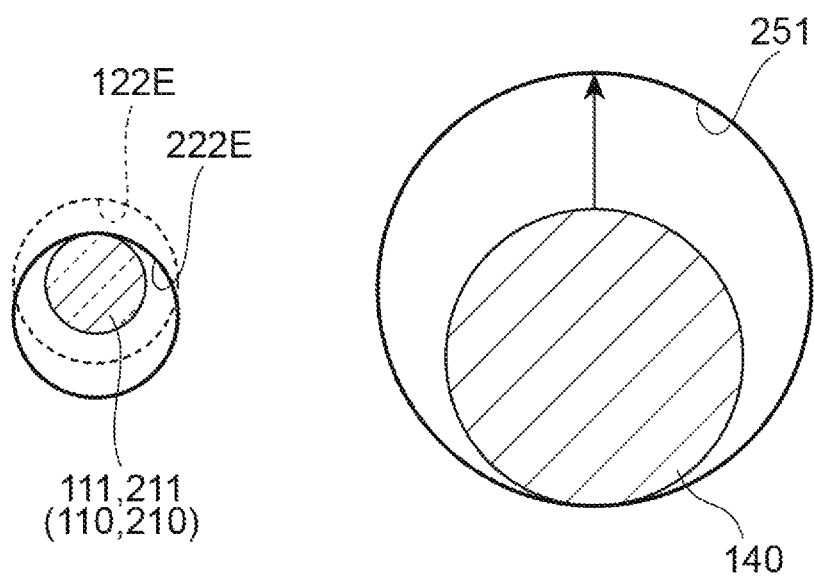
FIG. 24 is an explanatory view of a relation between a clearance between a guide pin and a guide hole and a clearance between a fiber and a fiber hole, with respect to the optical fibers abutting each other illustrated in FIG. 23.

FIGS. 22 to 24 are views illustrating an optical connection structure 1E according to Modification example 3. The optical connection structure 1E includes a first optical connector 100E and a second optical connector 200E. Similar to the first embodiment and the like, the first optical connector 100E includes a front ferrule 120E and a rear ferrule 130E, and a restriction member 150E for restricting bending of the optical fibers 110 is provided in the rear ferrule 130E. Similar to the first embodiment, the second optical connector 200E includes a front ferrule 220E and a rear ferrule 230E, and a bending portion 240E for controlling a bending direction of the optical fibers 210 is provided in the rear ferrule 230E. In this optical connection structure 1E, a front end surface 121E of the front ferrule 120E and a front end surface 221E of the front ferrule 220E become surfaces inclined with respect to a surface orthogonal to the axial direction (for example, negative 8 degrees). However, they are inclined in a direction opposite to that of Modification example 2.

In the optical connection structure 1E according to Modification example 3, as illustrated in FIGS. 23 and 24, when clearances of the optical fibers 110 and 210 with respect to fiber holes 122E and 222E are smaller than clearances of the guide pins 140 with respect to the guide holes 251 (refer to FIGS. 24 and 1), as illustrated in FIG. 23, the front ferrule 120E is misaligned in a downward direction so that the optical fibers 110 inserted into the fiber holes 222E are angled. For this reason, the optical fibers 110 contacts to wall surfaces of the fiber holes 222E. Accordingly, axial misalignment between connected fibers becomes small. In the optical connection structure 1E, a connection loss in optical connection between the optical fibers 110 and the optical fibers 210 can be reduced.

Modification Example 4

Figure 25:
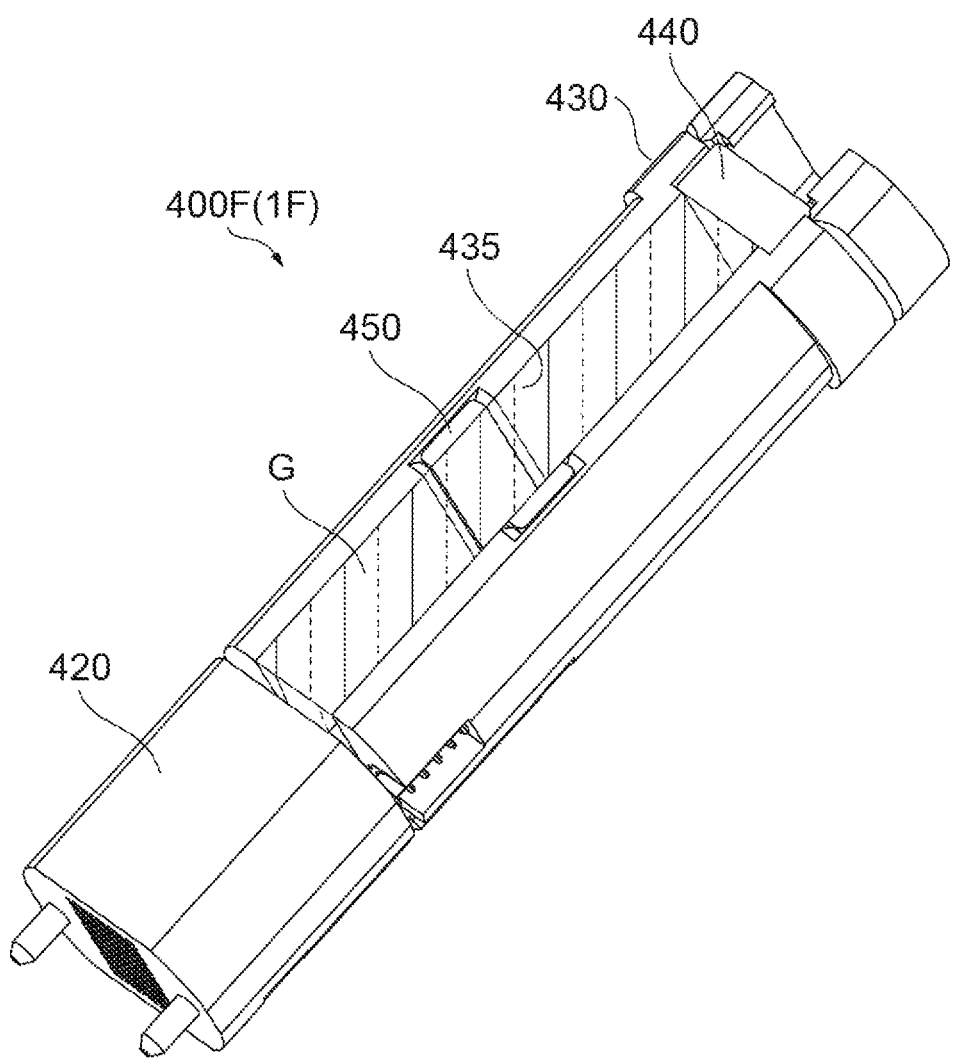
FIG. 25 is a perspective view illustrating a core part used in an optical connection structure according to a fourth modification example.
Figure 26A:
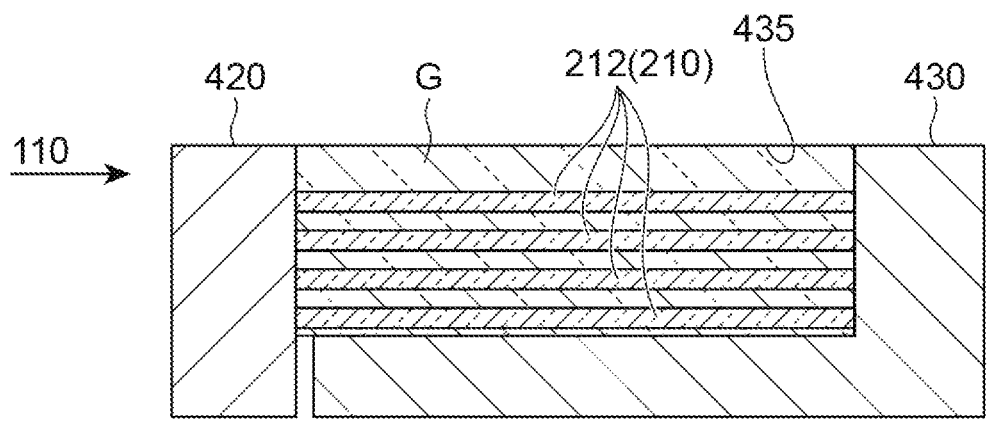
FIGS. 26A and 26B are cross-sectional views illustrating a method for controlling bending of optical fiber in the core part according to the fourth modification example.
Figure 26B:
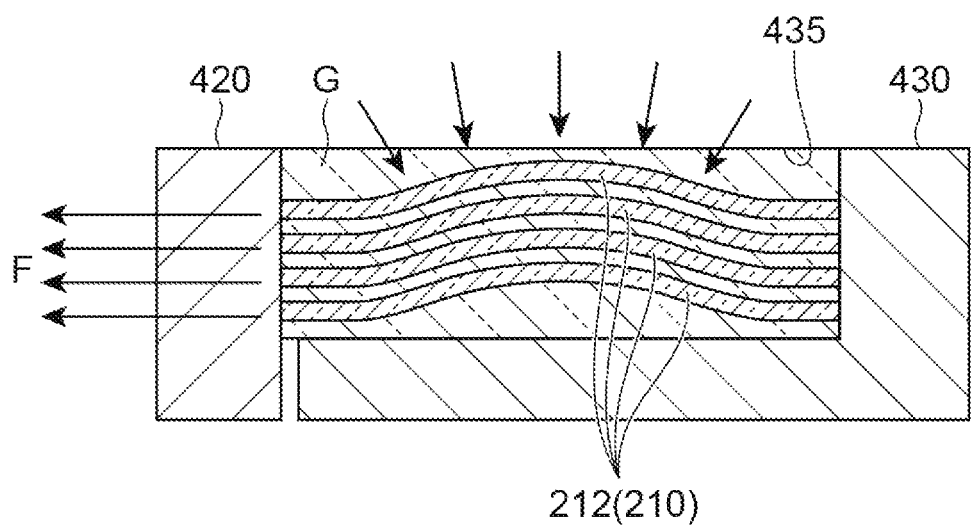

FIGS. 25, 26A, and 26B are views illustrating an optical connection structure 1F (core part 400F) according to Modification example 4. In Modification example 4, a modification example of the core part 400 used in the third embodiment will be described, and the constitution is otherwise similar to that of the third embodiment. As illustrated in FIG. 25, when the core part 400F is used in the female-type second optical connector, a gap part 435 (bent space) of the rear ferrule 430 of the core part 400F is filled with a gelatinous substance G. By filling the gap part 435 with such a gelatinous substance G such that a part around the optical fibers 210 (parts 212) is covered, as illustrated in FIG. 26A, when the optical fibers from the male-type first optical connector 300 are inserted into the second optical connector 300A, the optical connector 300A (second optical connector) is bent, as illustrated in FIG. 26B. In the core part 400F according to this modification example, the gelatinous substance G applies a returning force to the bent optical fibers 210. Accordingly, the repulsive force F (pressurizing force) can be additionally generated in the optical fibers 210 due to the gelatinous substance G. As a result, a pressurizing force when optical fibers abut each other for PC-connection can be sufficiently ensured, and optical connection can be more reliably performed. Congestion between bent optical fibers can be reduced, and the optical fibers can be bent in an aligned state.

APPENDIX

The following is further appended to the present disclosure,

[Article. 1] An optical connector includes:
 a plurality of optical fibers each extending in a longitudinal direction;
 an optical ferrule that includes a front end surface and a plurality of fiber holes opening on the front end surface and that holds the plurality of optical fibers; and
 a shutter member covering the front end surface of the optical ferrule.

[Article 2] The optical connector according to Article 1,
 wherein the shutter member includes a shutter main body accommodating the optical ferrule on an inward side thereof, and a pair of shutter plates that are turnably attached to the shutter main body centering on an axis extending in a direction intersecting the longitudinal direction and that cover the front end surface.

[Article 3] The optical connector according to Article 2,
 wherein the shutter main body is able to relatively move rearward in the longitudinal direction with respect to the optical ferrule, and
 wherein the pair of shutter plates are configured to move rotationally to be open in accordance with the optical ferrule moving forward in the longitudinal direction with respect to the shutter main body.

[Article 4] The optical connector according to Article 2 or 3,
 wherein the pair of shutter plates cover the front end surface of the optical ferrule extending in a direction inclined with respect to the longitudinal direction in which the shutter main body extends.

[Article. 5] The optical connector according to Articles 1 to 4,
 wherein the pair of shutter plates and the shutter main body are constituted using elastically deformable materials.

What is claimed is:
1. An optical connection structure comprising:
 a plurality of first optical fibers each extending in a longitudinal direction;
 a plurality of second optical fibers each extending in the longitudinal direction;
 a first optical connector including a first front end surface and a plurality of first fiber holes opening on the first front end surface, the first optical connector holding the plurality of first optical fibers; and
 a second optical connector including a second front end surface and a plurality of second fiber holes opening on the second front end surface, the second optical connector holding the plurality of second optical fibers,
 wherein the first optical connector is configured such that each of first distal end portions of the plurality of first optical fibers respectively accommodated in the plurality of first fiber holes protrudes from the first front end surface outside of the plurality of first fiber holes when the first optical connector and the second optical connector are connected to each other,
 wherein each of the first distal end portions protruding from the first front end surface is inserted into a corresponding second fiber hole of the plurality of second fiber holes of the second optical connector,
 wherein the second optical connector is configured such that each of second distal end portions of the plurality of second optical fibers is moved rearward inside the plurality of second fiber holes due to each of the first distal end portions respectively inserted into the plu- rality of second fiber holes when the first optical connector and the second optical connector are connected to each other, and wherein the plurality of first optical fibers and the plurality of second optical fibers are optically coupled to each other inside the plurality of second fiber holes when the first optical connector and the second optical connector are connected to each other.

2. The optical connection structure according to claim 1, wherein the first optical connector includes a first front ferrule including the first front end surface and the plurality of first fiber holes, and a first rear ferrule holding the plurality of first optical fibers, and wherein the first front ferrule is able to relatively move in the longitudinal direction with respect to the first rear ferrule.

3. The optical connection structure according to claim 2, wherein the first front ferrule includes a pair of guide holes provided in the longitudinal direction, and wherein the first front ferrule is able to relatively move in the longitudinal direction with respect to the first rear ferrule along a pair of guide pins fixed to the first rear ferrule.

4. The optical connection structure according to claim 3, wherein the second optical connector includes a pair of guide holes provided in the longitudinal direction, and wherein the pair of guide pins inserted into the pair of guide holes of the first front ferrule and protruding from the first front end surface are respectively inserted into the pair of guide holes of the second optical connector when the first optical connector and the second optical connector are connected to each other.

5. The optical connection structure according to claim 2, wherein the second optical connector includes a second front ferrule including the second front end surface and the plurality of second fiber holes, and a second rear ferrule holding the plurality of second optical fibers, and wherein the second front ferrule is fixed to the second rear ferrule.

6. The optical connection structure according to claim 5, wherein shapes of the first front ferrule and the second front ferrule are the same as each other, and wherein shapes of the first rear ferrule and the second rear ferrule are the same as each other.

7. The optical connection structure according to claim 1, wherein the first optical connector further includes a restriction member configured to restrict bending of a part of the plurality of first optical fibers leading to the respective first distal end portions when each of the first distal end portions of the plurality of first optical fibers protrudes from the first front end surface to the outside.

8. The optical connection structure according to claim 1, wherein an amount of each of the first distal end portions of the plurality of first optical fibers caused to protrude from the first front end surface by the first optical connector when the first optical connector and the second optical connector are connected to each other is 2 mm or shorter.

9. The optical connection structure according to claim 1, wherein the second optical connector further includes a bending portion configured to bend a part of the plurality of second optical fibers leading to the respective second distal end portions when each of the second distal end portions of the plurality of second optical fibers is moved rearward.

10. The optical connection structure according to claim 9, wherein a length of the bending portion in the longitudinal direction is equal to or greater than 10 mm and equal to or less than 20 mm.

11. The optical connection structure according to claim 9, wherein the bending portion includes a bending control mechanism configured to control a bending direction of the plurality of second optical fibers.

12. The optical connection structure according to claim 1, wherein each of the first distal end portions and each of the second distal end portions are constituted of glass fibers in which a coating resin is removed, and a length of each of the glass fibers in the longitudinal direction is equal to or greater than 2 mm and equal to or less than 5 mm.

13. The optical connection structure according to claim 12, wherein a length of a hole part of the plurality of second fiber holes holding a part having each of the first distal end portions and each of the second distal end portions constituted of the glass fibers abutting each other is equal to or greater than 1 mm and equal to or less than 3 mm in the longitudinal direction.

14. The optical connection structure according to claim 1, wherein the plurality of first fiber holes include forty or more fiber holes, and the plurality of first optical fibers include forty or more optical fibers, wherein the plurality of second fiber holes include forty or more fiber holes, and the plurality of second optical fibers include forty or more optical fibers, wherein a corresponding optical fiber of the plurality of first optical fibers is disposed in each of the plurality of first fiber holes, and wherein a corresponding optical fiber of the plurality of second optical fibers is disposed in each of the plurality of second fiber holes.

15. The optical connection structure according to claim 1, wherein the first front end surface is inclined with respect to a surface orthogonal to axes of the plurality of first fiber holes, and wherein the second front end surface is inclined with respect to a surface orthogonal to axes of the plurality of second fiber holes.

* * * * *